US012659090B2

(12) United States Patent
Wang et al.

(10) Patent No.: US 12,659,090 B2
(45) Date of Patent: Jun. 16, 2026

(54) COMMUNICATION METHOD, APPARATUS, AND SYSTEM

(71) Applicant: Huawei Technologies Co., Ltd., Shenzhen (CN)

(72) Inventors: Ting Wang, Shanghai (CN); Yongxia Lyu, Shenzhen (CN); Jun Wang, Shanghai (CN); Jianglei Ma, Ottawa (CA); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 235 days.

(21) Appl. No.: 18/496,273

(22) Filed: Oct. 27, 2023

(65) Prior Publication Data

US 2024/0056241 A1      Feb. 15, 2024

Related U.S. Application Data

(63) Continuation of application No. PCT/CN2022/088249, filed on Apr. 21, 2022.

(30) Foreign Application Priority Data

Apr. 30, 2021      (CN) .......................... 202110482693.2

(51) Int. Cl.
*H04L 5/00*           (2006.01)
(52) U.S. Cl.
CPC .................................... *H04L 5/001* (2013.01)

(58) Field of Classification Search
CPC ..... H04L 5/001; H04L 5/0035; H04L 5/0098; H04L 5/0008; H04L 5/0053; H04W 52/34
See application file for complete search history.

(56) References Cited

U.S. PATENT DOCUMENTS

2017/0013630 A1*   1/2017   Franz .................. H04W 72/542
2019/0173626 A1     6/2019   Wang et al.

FOREIGN PATENT DOCUMENTS

CN        103238368 A      8/2013
CN        111757292 A      10/2020
WO        2020165778 A1    8/2020

* cited by examiner

*Primary Examiner* — Diane D Mizrahi
(74) *Attorney, Agent, or Firm* — Slater Matsil, LLP

(57)                ABSTRACT

This application provides a communication method. The method includes: A first communication apparatus obtains first configuration information, and performs carrier aggregation communication on at least two transmit carriers based on the first configuration information. The first configuration information indicates the first communication apparatus to perform carrier aggregation communication on the at least two transmit carriers, the at least two transmit carriers include a first transmit carrier and a second transmit carrier, the first transmit carrier corresponds to a first communication standard, the second transmit carrier corresponds to a second communication standard, and the first communication standard is different from the second communication standard.

18 Claims, 10 Drawing Sheets

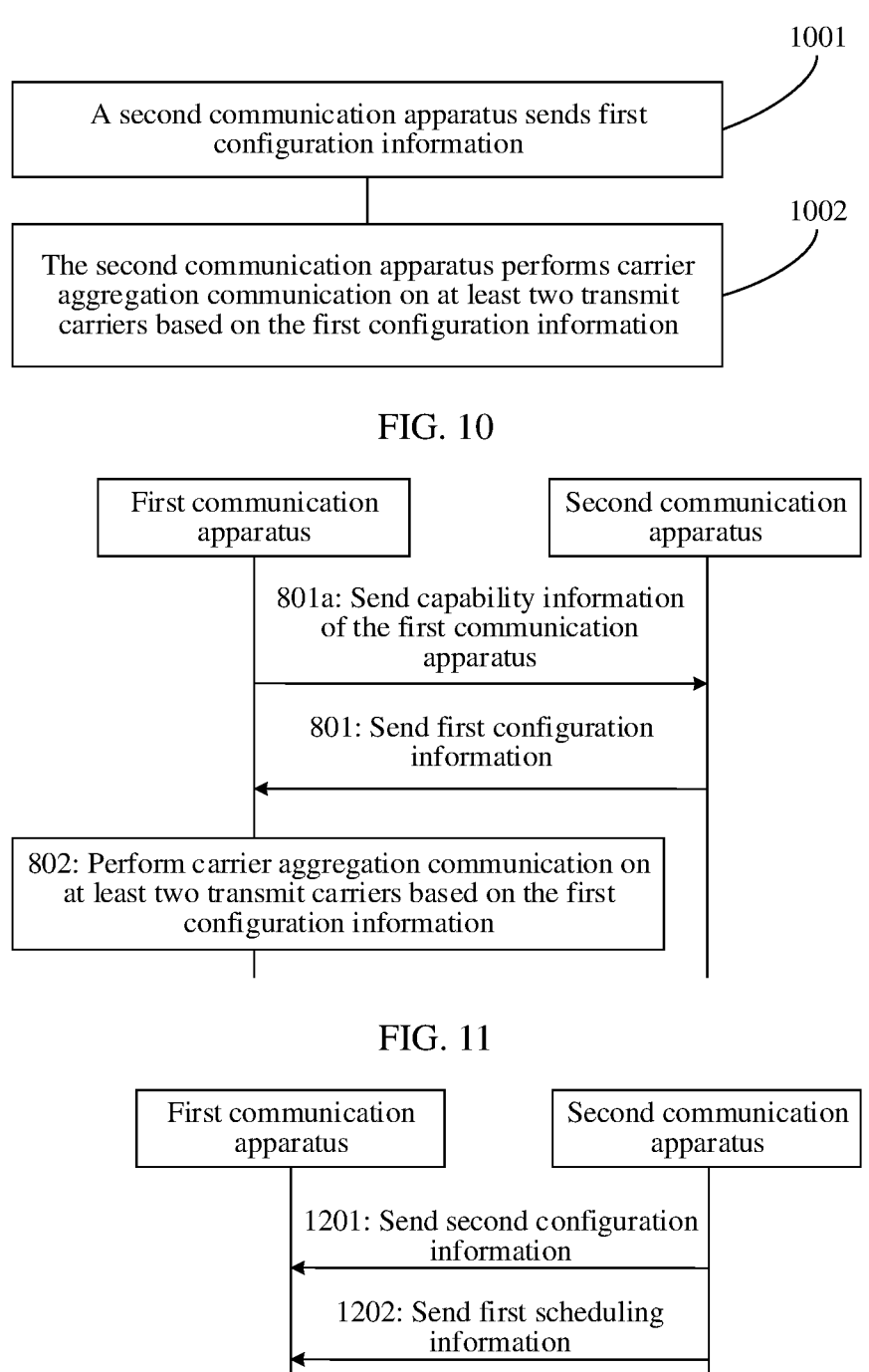

1001

A second communication apparatus sends first configuration information

1002

The second communication apparatus performs carrier aggregation communication on at least two transmit carriers based on the first configuration information

FIG. 10

First communication apparatus

Second communication apparatus

801a: Send capability information of the first communication apparatus

801: Send first configuration information

802: Perform carrier aggregation communication on at least two transmit carriers based on the first configuration information

FIG. 11

First communication apparatus

Second communication apparatus

1201: Send second configuration information

1202: Send first scheduling information

1203: Switch, based on the first scheduling information, from a transmit carrier for receiving the first scheduling information to a transmit carrier indicated by the first scheduling information

FIG. 12

COMMUNICATION METHOD, APPARATUS, AND SYSTEM

CROSS-REFERENCE TO RELATED APPLICATIONS

This application is a continuation of International Application No. PCT/CN2022/088249, filed on Apr. 21, 2022, which claims priority to Chinese Patent Application No. 202110482693.2, filed on Apr. 30, 2021. The disclosures of the aforementioned applications are hereby incorporated by reference in their entireties.

TECHNICAL FIELD

This application relates to the field of communication technologies, and in particular, to a communication method, apparatus, and system.

BACKGROUND

In an existing communication system, a terminal device or a network device may aggregate a plurality of carriers based on carrier aggregation (CA), to implement large transmission bandwidth and improve uplink and downlink transmission rates. Alternatively, the terminal device may perform offloading between two links based on dual connectivity (DC), and perform carrier aggregation on each link, to increase a throughput of a single user.

Different communication standards may correspond to different carriers. The communication standard may include a 2nd generation (2G) standard, a 3G standard, a 4G standard, a 5G standard, a 6G standard, another communication standard, or the like.

To further improve a communication capacity of the communication system, an inter-radio access technology (inter-RAT) communication mechanism is provided. However, the CA supports only carrier aggregation on carriers of a same communication standard. In other words, when performing carrier aggregation, the terminal device or the network device can perform carrier aggregation communication only based on carriers of a same communication standard. In addition, communication on the two links in the DC uses independent schedulers, and consequently flexible coordination between carriers of different radio access technologies (RATs) cannot be implemented, and spectral efficiency is reduced. In other words, the existing CA and DC cannot well support the inter-RAT communication mechanism. As a result, a capacity of the communication system is limited, and communication performance of the communication system is affected.

SUMMARY

In view of this, this application provides a communication method, apparatus, and system, to resolve a technical problem that a capacity of a communication system is limited and communication performance of the communication system is affected because CA and DC cannot support an inter-RAT communication mechanism.

According to a first aspect, an embodiment of this application provides a communication method. The method includes: A first communication apparatus obtains first configuration information, and performs carrier aggregation communication on at least two transmit carriers based on the first configuration information. The first configuration information indicates the first communication apparatus to perform carrier aggregation communication on the at least two transmit carriers, the at least two transmit carriers include a first transmit carrier and a second transmit carrier, the first transmit carrier corresponds to a first communication standard, the second transmit carrier corresponds to a second communication standard, and the first communication standard is different from the second communication standard.

According to the first aspect, the first communication apparatus may perform carrier aggregation communication on transmit carriers of different communication standards based on the first configuration information, so that an inter-RAT communication mechanism can be effectively supported, a capacity of a communication system can be improved, spectral efficiency can be improved, and communication performance of the communication system can be improved. In this solution, inter-RAT transmit carrier aggregation can be implemented, unified uplink scheduling and transmission for a plurality of communication standards can be flexibly implemented, and uplink communication performance can be improved.

In a possible design, the first configuration information includes configuration information of at least two transmit standard carrier groups, where the configuration information of the transmit standard carrier group includes identification information of the transmit standard carrier group and identification information of at least one transmit carrier in the transmit standard carrier group, and the identification information of the transmit standard carrier group indicates a communication standard corresponding to the transmit standard carrier group.

Based on this possible design, configuration of transmit carriers of a plurality of RATs is implemented by configuring configuration information of transmit standard carrier groups, and a transmit carrier is added to or deleted from the configuration information of the transmit standard carrier group, so that flexible sending of carrier configurations of a plurality of communication standards can be implemented.

In a possible design, the first configuration information includes identification information of at least two transmit standard carrier groups and identification information of at least one transmit carrier in the transmit standard carrier group, where the identification information of the transmit standard carrier group indicates a communication standard corresponding to the transmit standard carrier group.

Based on this possible design, configuration of transmit carriers of a plurality of RATs is implemented by configuring identification information of transmit standard carrier groups, and a communication standard of an added or deleted transmit carrier is determined based on the identification information of the transmit standard carrier group, so that flexible sending of carrier configurations of a plurality of communication standards can be implemented.

Based on the foregoing two possible designs, the first communication apparatus may determine the transmit carrier based on the identification information of the transmit standard carrier group and the identification information of the transmit carrier in the first configuration information, and determine the communication standard of the transmit carrier based on the identification information of the transmit standard carrier group corresponding to the transmit carrier.

In a possible design, the first configuration information includes identification information and standard information of the at least two transmit carriers, where the standard information indicates a communication standard of a transmit carrier corresponding to the identification information.

Based on this possible design, configuration of transmit carriers of a plurality of RATs is implemented by directly configuring the transmit carriers, and a transmit carrier is directly added to or deleted from the first configuration information, so that flexible sending of carrier configurations of a plurality of communication standards can be implemented. The first communication apparatus may determine the transmit carrier based on the identification information of the transmit carrier, and determine the communication standard of the transmit carrier based on the standard information.

In a possible design, the first configuration information includes identification information of the at least two transmit carriers, and the identification information of the transmit carrier indicates a communication standard of the transmit carrier.

Based on this possible design, the first communication apparatus may alternatively determine the transmit carrier based on the identification information of the transmit carrier, and determine the communication standard of the transmit carrier based on a frequency band of the transmit carrier.

In a possible design, the first communication apparatus sends capability information of the first communication apparatus, where the capability information of the first communication apparatus indicates one or more of the following capabilities: a communication standard supported by the first communication apparatus, that the first communication apparatus supports inter-RAT CA, that the first communication apparatus supports SRS switching in the inter-RAT CA, that the first communication apparatus supports joint UCI feedback in the inter-RAT CA, and that the first communication apparatus supports symbol-level dynamic power sharing in the inter-RAT CA.

Based on this possible design, the first communication apparatus may report the capability information of the first communication apparatus to a second communication apparatus, so that the second communication apparatus configures the at least two transmit carriers for the first communication apparatus based on the capability information of the first communication apparatus. In this way, the first communication apparatus effectively supports the inter-RAT communication mechanism, and the capacity of the communication system is improved. In addition, the spectral efficiency can be improved, and the communication performance of the communication system can be improved.

In a possible design, the first communication apparatus obtains second configuration information, where the second configuration information includes configuration information of at least one SRS switching carrier group, each SRS switching carrier group indicates a transmit carrier before SRS switching and a transmit carrier after SRS switching, and a communication standard of the transmit carrier before SRS switching is different from a communication standard of the transmit carrier after SRS switching.

Based on this possible design, the first communication apparatus may effectively support the SRS switching in the inter-RAT CA based on the second configuration information.

In a possible design, the first communication apparatus obtains first scheduling information indicating the second transmit carrier, and the first communication apparatus switches from the first transmit carrier to the second transmit carrier based on the first scheduling information.

Based on this possible design, the first communication apparatus may switch from a transmit carrier for receiving the first scheduling information to a transmit carrier indicated by the first scheduling information, to effectively support the SRS switching in the inter-RAT CA.

In a possible design, the first communication apparatus obtains first control information, where the first control information indicates transmit power control TPC commands of the at least two transmit carriers.

Based on this possible design, the second communication apparatus may indicate TPC commands of transmit carriers of a plurality of communication standards by using the first control information, so that complexity of detecting control information by the first communication apparatus can be reduced, overheads of the control information can be reduced, and the communication performance can be improved.

In a possible design, the first communication apparatus obtains second control information and third control information, where the second control information indicates a transmit power control TPC command of a transmit carrier corresponding to the first communication standard, and the third control information indicates a TPC command of a transmit carrier corresponding to the second communication standard.

Based on this possible design, the second communication apparatus may separately indicate TPC commands of transmit carriers of a plurality of communication standards by using a plurality of pieces of control information, so that flexible indication of TPC commands of a plurality of carriers can be implemented, and the communication performance can be improved.

In a possible design, one or more of the following information corresponding to the second control information and the third control information is different: control information formats and RNTIs.

Based on this possible design, the second control information and the third control information may correspond to different control information formats and/or RNTIs. For control information of a determined communication standard, the first communication apparatus may detect a control information format and/or an RNTI corresponding to the control information, so that complexity of receiving the control information by the first communication apparatus is reduced, and the communication performance is improved.

Based on the foregoing three possible designs, the TPC commands of the at least two transmit carriers corresponding to communication standards may be carried in a same piece of control information, or may be separately carried, based on the communication standards, in control information corresponding to the communication standards. This provides feasible solutions for the first communication apparatus to obtain a TPC command of each transmit carrier.

In a possible design, the first communication apparatus determines, based on identification information of each of the at least two transmit carriers and identification information of a transmit standard carrier group corresponding to each transmit carrier, a location of a TPC command of each transmit carrier in control information corresponding to the transmit carrier. Alternatively, the first communication apparatus determines, based on identification information of each of the at least two transmit carriers, a location of a TPC command of each transmit carrier in control information corresponding to the transmit carrier. Alternatively, the first communication apparatus obtains fourth configuration information, where the fourth configuration information indicates a location of a TPC command of each of the at least two transmit carriers in control information corresponding to the transmit carrier.

Based on this possible design, the location of the TPC command of the transmit carrier in the control information corresponding to the transmit carrier is determined in a predefined manner, so that indication overheads can be reduced. The location of the TPC command of the transmit carrier in the control information corresponding to the transmit carrier is determined based on the configuration information, so that the location of the TPC command in the control information can be flexibly implemented, and transmission flexibility of the control information is improved. In addition, the first communication apparatus may determine, in any one of the foregoing three manners, the location of the TPC command of each transmit carrier in the control information corresponding to the transmit carrier, and this provides a feasible solution for the first communication apparatus to determine the TPC command of each transmit carrier.

In a possible design, the first communication apparatus obtains third configuration information, where the third configuration information indicates a first transmission control channel carrier and a second transmission control channel carrier, the first transmission control channel carrier corresponds to the first communication standard, and the second transmission control channel carrier corresponds to the second communication standard. The first communication apparatus sends, on the first transmission control channel carrier, transmission control information corresponding to the first communication standard. The first communication apparatus sends, on the second transmission control channel carrier, transmission control information corresponding to the second communication standard.

Based on this possible design, the first communication apparatus may send, by using different transmission control channel carriers, transmission control information corresponding to different communication standards, so that the second communication apparatus distinguishes, based on the different transmission control channel carriers, the transmission control information corresponding to the different communication standards. This reduces complexity of transmitting the transmission control information by the first communication apparatus.

In a possible design, the first communication apparatus determines a third transmission control channel carrier, where the third transmission control channel carrier corresponds to the first communication standard or the second communication standard. The first communication apparatus sends, on the third transmission control channel carrier, transmission control information corresponding to the first communication standard and transmission control information corresponding to the second communication standard.

Based on this possible design, the first communication apparatus may alternatively send, by using a same transmission control channel carrier, transmission control information corresponding to communication standards. This reduces complexity of transmitting the transmission control information by the first communication apparatus, and improves transmission performance through joint transmission.

In a possible design, the first communication apparatus obtains third configuration information, where the third configuration information indicates the third transmission control channel carrier and a fourth transmission control channel carrier. The first communication apparatus obtains second scheduling information, where the second scheduling information indicates the third transmission control channel carrier. The first communication apparatus determines the third transmission control channel carrier based on the second scheduling information.

In a possible design, the first communication apparatus obtains third configuration information, where the third configuration information indicates the third transmission control channel carrier.

Based on the foregoing two possible designs, the first communication apparatus may dynamically determine the transmission control channel carrier based on the second scheduling information, which provides flexibility and improves transmission performance; or may determine the transmission control channel carrier based on the configuration information. This provides a plurality of feasible solutions for the first communication apparatus to determine the transmission control channel carrier.

In a possible design, the first communication apparatus encodes, based on a communication standard corresponding to the third transmission control channel carrier, the transmission control information corresponding to the first communication standard and the transmission control information corresponding to the second communication standard, to obtain first transmission control information. The first communication apparatus sends the first transmission control information by using a first resource of the third transmission control channel carrier.

In a possible design, the first communication apparatus encodes, based on a communication standard corresponding to the third transmission control channel carrier, the transmission control information corresponding to the first communication standard, to obtain second transmission control information. The first communication apparatus encodes, based on the communication standard corresponding to the third transmission control channel carrier, the transmission information corresponding to the second communication standard, to obtain third transmission control information. The first communication apparatus sends the second transmission control information by using a second resource of the third transmission control channel carrier. The first communication apparatus sends the third transmission control information by using a third resource of the third transmission control channel carrier.

Based on the foregoing two possible designs, the first communication apparatus may encode transmission control information corresponding to communication standards supported by the first communication apparatus, and send the transmission control information to the second communication apparatus by using a same resource of the transmission control channel carrier. Alternatively, the first communication apparatus may separately encode transmission control information corresponding to communication standards, and send the transmission control information to the second communication apparatus by using different resources. This is not limited.

In a possible design, when a symbol of a channel corresponding to the first communication standard overlaps a symbol of a channel corresponding to the second communication standard, the first communication apparatus determines, based on a transmit power of the symbol of the channel corresponding to the first communication standard, a transmit power of the symbol of the channel corresponding to the second communication standard.

Based on this possible design, the first communication apparatus may determine, based on the transmit power of the symbol of the channel corresponding to the first communication standard, the transmit power of the symbol of the channel corresponding to the second communication standard, to prevent the second communication apparatus from indicating the transmit power of the symbol of the channel corresponding to the second communication standard to the first communication apparatus, and therefore reduce signaling overheads. In addition, through dynamic power sharing, the first communication apparatus may flexibly adjust powers of transmission channels in a plurality of communication standards based on an actual requirement, and therefore communication performance of transmission is improved.

In a possible design, the first communication apparatus determines transmit powers of a plurality of channels on an overlapping symbol based on channel priorities. Alternatively, the first communication apparatus allocates transmit powers of a plurality of channels on an overlapping symbol at an equal proportion.

Based on this possible design, the first communication apparatus may determine the transmit powers of the plurality of channels based on the channel priorities, to preferentially meet transmission of a channel with a high priority, and ensure communication performance of the channel with the high priority. Alternatively, allocation is performed for the first communication standard at an equal proportion, to reduce processing complexity of power sharing.

Based on this possible design, the first communication apparatus may allocate the transmit powers of the plurality of channels on the overlapping symbol based on the channel priorities or at an equal proportion. This provides a plurality of feasible solutions for the first communication apparatus to allocate the transmit powers of the plurality of channels on the overlapping symbol.

According to a second aspect, an embodiment of this application provides a first communication apparatus. The first communication apparatus may implement functions performed by the first communication apparatus in the first aspect or the possible designs of the first aspect. The functions may be implemented by hardware by executing corresponding software. The hardware or the software includes one or more modules corresponding to the functions, for example, a transceiver unit and a processing unit. The transceiver unit is configured to obtain first configuration information, and the processing unit is configured to perform carrier aggregation communication on at least two transmit carriers based on the first configuration information. The first configuration information indicates the first communication apparatus to perform carrier aggregation communication on the at least two transmit carriers, the at least two transmit carriers include a first transmit carrier and a second transmit carrier, the first transmit carrier corresponds to a first communication standard, the second transmit carrier corresponds to a second communication standard, and the first communication standard is different from the second communication standard.

In a possible design, the first configuration information includes configuration information of at least two transmit standard carrier groups, where the configuration information of the transmit standard carrier group includes identification information of the transmit standard carrier group and identification information of at least one transmit carrier in the transmit standard carrier group, and the identification information of the transmit standard carrier group indicates a communication standard corresponding to the transmit standard carrier group.

In a possible design, the first configuration information includes identification information of at least two transmit standard carrier groups and identification information of at least one transmit carrier in the transmit standard carrier group, where the identification information of the transmit standard carrier group indicates a communication standard corresponding to the transmit standard carrier group.

In a possible design, the first configuration information includes identification information and standard information of the at least two transmit carriers, where the standard information indicates a communication standard of a transmit carrier corresponding to the identification information.

In a possible design, the first configuration information includes identification information of the at least two transmit carriers, and the identification information of the transmit carrier indicates a communication standard of the transmit carrier.

In a possible design, the transceiver unit is further configured to send capability information of the first communication apparatus, where the capability information of the first communication apparatus indicates one or more of the following capabilities: a communication standard supported by the first communication apparatus, that the first communication apparatus supports inter-RAT CA, that the first communication apparatus supports SRS switching in the inter-RAT CA, that the first communication apparatus supports joint UCI feedback in the inter-RAT CA, and that the first communication apparatus supports symbol-level dynamic power sharing in the inter-RAT CA.

In a possible design, the transceiver unit is further configured to obtain second configuration information, where the second configuration information includes configuration information of at least one SRS switching carrier group, each SRS switching carrier group indicates a transmit carrier before SRS switching and a transmit carrier after SRS switching, and a communication standard of the transmit carrier before SRS switching is different from a communication standard of the transmit carrier after SRS switching.

In a possible design, the transceiver unit is further configured to obtain first scheduling information indicating the second transmit carrier, and the first communication apparatus switches from the first transmit carrier to the second transmit carrier based on the first scheduling information.

In a possible design, the transceiver unit is further configured to obtain first control information, where the first control information indicates transmit power control TPC commands of the at least two transmit carriers.

In a possible design, the transceiver unit is further configured to obtain second control information and third control information, where the second control information indicates a transmit power control TPC command of a transmit carrier corresponding to the first communication standard, and the third control information indicates a TPC command of a transmit carrier corresponding to the second communication standard.

In a possible design, one or more of the following information corresponding to the second control information and the third control information is different: control information formats and RNTIs.

In a possible design, the processing unit is further configured to determine, based on identification information of each of the at least two transmit carriers and identification information of a transmit standard carrier group corresponding to each transmit carrier, a location of a TPC command of each transmit carrier in control information corresponding to the transmit carrier. Alternatively, the processing unit is further configured to determine, based on identification information of each of the at least two transmit carriers, a location of a TPC command of each transmit carrier in control information corresponding to the transmit carrier. Alternatively, the processing unit is further configured to obtain fourth configuration information, where the fourth configuration information indicates a location of a TPC command of each of the at least two transmit carriers in control information corresponding to the transmit carrier.

In a possible design, the transceiver unit is further configured to obtain third configuration information, where the third configuration information indicates a first transmission control channel carrier and a second transmission control channel carrier, the first transmission control channel carrier corresponds to the first communication standard, and the second transmission control channel carrier corresponds to the second communication standard. The transceiver unit is further configured to send, on the first transmission control channel carrier, transmission control information corresponding to the first communication standard. The transceiver unit is further configured to send, on the second transmission control channel carrier, transmission control information corresponding to the second communication standard.

In a possible design, the processing unit is further configured to determine a third transmission control channel carrier, where the third transmission control channel carrier corresponds to the first communication standard or the second communication standard. The transceiver unit is further configured to send, on the third transmission control channel carrier, transmission control information corresponding to the first communication standard and transmission control information corresponding to the second communication standard.

In a possible design, the transceiver unit is further configured to obtain third configuration information, where the third configuration information indicates the third transmission control channel carrier and a fourth transmission control channel carrier. The transceiver unit is further configured to obtain second scheduling information, where the second scheduling information indicates the third transmission control channel carrier. The processing unit is further configured to determine the third transmission control channel carrier based on the second scheduling information.

In a possible design, the transceiver unit is further configured to obtain third configuration information, where the third configuration information indicates the third transmission control channel carrier.

In a possible design, the processing unit is further configured to encode, based on a communication standard corresponding to the third transmission control channel carrier, the transmission control information corresponding to the first communication standard and the transmission control information corresponding to the second communication standard, to obtain first transmission control information. The transceiver unit is further configured to send the first transmission control information by using a first resource of the third transmission control channel carder.

In a possible design, the processing unit is further configured to encode, based on a communication standard corresponding to the third transmission control channel carrier, the transmission control information corresponding to the first communication standard, to obtain second transmission control information. The processing unit is further configured to encode, based on the communication standard corresponding to the third transmission control channel carrier, the transmission information corresponding to the second communication standard, to obtain third transmission control information. The transceiver unit is further configured to send the second transmission control information by using a second resource of the third transmission control channel carrier. The transceiver unit is further configured to send the third transmission control information by using a third resource of the third transmission control channel carrier.

In a possible design, when a symbol of a channel corresponding to the first communication standard overlaps a symbol of a channel corresponding to the second communication standard, the processing unit is further configured to determine, based on a transmit power of the symbol of the channel corresponding to the first communication standard, a transmit power of the symbol of the channel corresponding to the second communication standard.

In a possible design, the processing unit is further configured to determine transmit powers of a plurality of channels on an overlapping symbol based on channel priorities. Alternatively, the processing unit is further configured to allocate transmit powers of a plurality of channels on an overlapping symbol at an equal proportion.

It should be noted that, for a specific implementation of the first communication apparatus in the second aspect, refer to behavior functions of the first communication apparatus in the communication method according to any one of the first aspect or the possible designs of the first aspect.

According to a third aspect, an embodiment of this application provides a first communication apparatus. The first communication apparatus may be the first communication apparatus, or a chip or a system on chip in the first communication apparatus. The first communication apparatus may implement functions performed by the first communication apparatus in the foregoing aspects or possible designs, and the functions may be implemented by hardware. In a possible design, the first communication apparatus may include a transceiver and a processor. The transceiver and the processor may be configured to support the first communication apparatus in implementing the functions in any one of the first aspect or the possible designs of the first aspect. For example, the transceiver may be configured to obtain first configuration information, and the processor may be configured to perform carrier aggregation communication on at least two transmit carriers based on the first configuration information. The first configuration information indicates the first communication apparatus to perform carrier aggregation communication on the at least two transmit carriers, the at least two transmit carriers include a first transmit carrier and a second transmit carrier, the first transmit carrier corresponds to a first communication standard, the second transmit carrier corresponds to a second communication standard, and the first communication standard is different from the second communication standard. In another possible design, the first communication apparatus may further include a memory. The memory is configured to store computer-executable instructions and data that are necessary for the first communication apparatus. When the first communication apparatus runs, the transceiver and the processor execute the computer-executable instructions stored in the memory, so that the first communication apparatus performs the communication method according to any one of the first aspect or the possible designs of the first aspect.

For a specific implementation of the first communication apparatus in the third aspect, refer to behavior functions of the first communication apparatus in the communication method according to any one of the first aspect or the possible designs of the first aspect.

According to a fourth aspect, an embodiment of this application provides a communication method. The method includes: A second communication apparatus sends first configuration information, and performs carrier aggregation communication on at least two transmit carriers based on the first configuration information. The first configuration information indicates a first communication apparatus to perform carrier aggregation communication on the at least two transmit carriers, the at least two transmit carriers include a first transmit carrier and a second transmit carrier, the first transmit carrier corresponds to a first communication standard, the second transmit carrier corresponds to a second communication standard, and the first communication standard is different from the second communication standard.

According to the fourth aspect, the second communication apparatus sends the first configuration information to the first communication apparatus, so that the first communication apparatus can perform carrier aggregation communication on transmit carriers of different communication standards based on the first configuration information. In addition, the second communication apparatus can also perform carrier aggregation communication on the transmit carriers of the different communication standards based on the first configuration information. This can effectively support an inter-RAT communication mechanism, improve a capacity of a communication system, improve spectral efficiency, and improve communication performance of the communication system. In this solution, inter-RAT transmit carrier aggregation can be implemented, unified uplink scheduling and transmission for a plurality of communication standards can be flexibly implemented, and uplink communication performance can be improved.

In a possible design, the first configuration information includes configuration information of at least two transmit standard carrier groups, where the configuration information of the transmit standard carrier group includes identification information of the transmit standard carrier group and identification information of at least one transmit carrier in the transmit standard carrier group, and the identification information of the transmit standard carrier group indicates a communication standard corresponding to the transmit standard carrier group.

Based on this possible design, configuration of transmit carriers of a plurality of RATs is implemented by configuring configuration information of transmit standard carrier groups, and a transmit carrier is added to or deleted from the configuration information of the transmit standard carrier group, so that flexible sending of carrier configurations of a plurality of communication standards can be implemented.

In a possible design, the first configuration information includes identification information of at least two transmit standard carrier groups and identification information of at least one transmit carrier in the transmit standard carrier group, where the identification information of the transmit standard carrier group indicates a communication standard corresponding to the transmit standard carrier group.

Based on this possible design, configuration of transmit carriers of a plurality of RATs is implemented by configuring identification information of transmit standard carrier groups, and a communication standard of an added or deleted transmit carrier is determined based on the identification information of the transmit standard carrier group, so that flexible sending of carrier configurations of a plurality of communication standards can be implemented.

Based on the foregoing two possible designs, the first communication apparatus may determine the transmit carrier based on the identification information of the transmit standard carrier group and the identification information of the transmit carrier in the first configuration information, and determine the communication standard of the transmit carrier based on the identification information of the transmit standard carrier group corresponding to the transmit carrier.

In a possible design, the first configuration information includes identification information and standard information of the at least two transmit carriers, where the standard information indicates a communication standard of a transmit carrier corresponding to the identification information.

Based on this possible design, configuration of transmit carriers of a plurality of RATs is implemented by directly configuring the transmit carriers, and a transmit carrier is directly added to or deleted from the first configuration information, so that flexible sending of carrier configurations of a plurality of communication standards can be implemented. The first communication apparatus may determine the transmit carrier based on the identification information of the transmit carrier, and determine the communication standard of the transmit carrier based on the standard information.

In a possible design, the first configuration information includes identification information of the at least two transmit carriers, and the identification information of the transmit carrier indicates a communication standard of the transmit carrier.

Based on this possible design, the first communication apparatus may determine the transmit carrier based on the identification information of the transmit carrier, and determine the communication standard of the transmit carrier based on a frequency band of the transmit carrier.

In a possible design, the second communication apparatus obtains capability information of the first communication apparatus, where the capability information of the first communication apparatus indicates one or more of the following capabilities: a communication standard supported by the first communication apparatus, that the first communication apparatus supports inter-radio access technology carrier aggregation RAT CA, that the first communication apparatus supports sounding reference signal SRS switching in the inter-RAT CA, that the first communication apparatus supports joint uplink control information UCI feedback in the inter-RAT CA, and that the first communication apparatus supports symbol-level dynamic power sharing in the inter-RAT CA.

Based on this possible design, the second communication apparatus may configure the at least two transmit carriers for the first communication apparatus based on the capability information of the first communication apparatus, so that the first communication apparatus effectively supports the inter-RAT communication mechanism, and the capacity of the communication system is improved. In addition, the spectral efficiency can be improved, and the communication performance of the communication system can be improved.

In a possible design, the second communication apparatus sends second configuration information, where the second configuration information includes configuration information of at least one SRS switching carrier group, each SRS switching carrier group indicates a transmit carrier before SRS switching and a transmit carrier after SRS switching, and a communication standard of the transmit carrier before SRS switching is different from a communication standard of the transmit carrier after SRS switching.

Based on this possible design, the first communication apparatus may effectively support the SRS switching in the inter-RAT CA based on the second configuration information.

In a possible design, the second communication apparatus sends first scheduling information indicating the second transmit carrier.

Based on this possible design, the first communication apparatus may switch from a transmit carrier for receiving the first scheduling information to a transmit carrier indicated by the first scheduling information, to effectively support the SRS switching in the inter-RAT CA.

In a possible design, the second communication apparatus sends first control information, where the first control information indicates transmit power control TPC commands of the at least two transmit carriers.

Based on this possible design, the second communication apparatus may indicate TPC commands of transmit carriers of a plurality of communication standards by using the first control information, so that complexity of detecting control information by the first communication apparatus can be reduced, overheads of the control information can be reduced, and the communication performance can be improved.

In a possible design, the second communication apparatus sends second control information and third control information, where the second control information indicates a transmit power control TPC command of a transmit carrier corresponding to the first communication standard, and the third control information indicates a TPC command of a transmit carrier corresponding to the second communication standard.

Based on this possible design, the second communication apparatus may separately indicate TPC commands of transmit carriers of a plurality of communication standards by using a plurality of pieces of control information, so that flexible indication of TPC commands of a plurality of carriers can be implemented, and the communication performance can be improved.

In a possible design, one or more of the following information corresponding to the second control information and the third control information is different: control information formats and RNTIs.

Based on this possible design, the second control information and the third control information may correspond to different control information formats and/or RNTIs. For control information of a determined communication standard, the first communication apparatus may detect a control information format and/or an RNTI corresponding to the control information, so that complexity of receiving the control information by the first communication apparatus is reduced, and the communication performance is improved.

Based on the foregoing three possible designs, the second communication apparatus may include the TPC commands of the at least two transmit carriers corresponding to communication standards in a same piece of control information, or may separately include, based on the communication standards, the TPC commands in control information corresponding to the communication standards. This provides feasible solutions for the second communication apparatus to send a TPC command of each transmit carrier.

In a possible design, the second communication apparatus sends third configuration information, where the third configuration information indicates a first transmission control channel carrier and a second transmission control channel carrier, the first transmission control channel carrier corresponds to the first communication standard, and the second transmission control channel carrier corresponds to the second communication standard. The second communication apparatus obtains, on the first transmission control channel carrier, transmission control information corresponding to the first communication standard. The second communication apparatus obtains, on the second transmission control channel carrier, transmission control information corresponding to the second communication standard.

Based on this possible design, the second communication apparatus may obtain, by using different transmission control channel carriers, transmission control information corresponding to different communication standards, to distinguish, based on the different transmission control channel carriers, the transmission control information corresponding to the different communication standards. This reduces complexity of receiving the transmission control information by the second communication apparatus.

In a possible design, the second communication apparatus obtains, on a third transmission control channel carrier, transmission control information corresponding to the first communication standard and transmission control information corresponding to the second communication standard, where the third transmission control channel carrier corresponds to the first communication standard or the second communication standard.

Based on this possible design, the second communication apparatus may alternatively obtain, by using a same transmission control channel carrier, transmission control information corresponding to communication standards. This reduces complexity of receiving the transmission control information by the second communication apparatus, and improves transmission performance through joint transmission.

In a possible design, the second communication apparatus sends third configuration information, where the third configuration information indicates the third transmission control channel carrier and a fourth transmission control channel carrier. The second communication apparatus sends second scheduling information, where the second scheduling information indicates the third transmission control channel carrier.

In a possible design, the second communication apparatus sends third configuration information, where the third configuration information indicates the third transmission control channel carrier.

Based on the foregoing two possible designs, the second communication apparatus may dynamically indicate the transmission control channel carrier based on the second scheduling information, which provides flexibility and improves transmission performance; or may indicate the transmission control channel carrier based on the configuration information. This provides a plurality of feasible solutions for the second communication apparatus to indicate the transmission control channel carrier.

In a possible design, the second communication apparatus obtains first transmission control information by using a first resource of the third transmission control channel carrier, where the first transmission control information is obtained by the first communication apparatus by encoding, based on a communication standard corresponding to the third transmission control channel carrier, the transmission control information corresponding to the first communication standard and the transmission control information corresponding to the second communication standard.

In a possible design, the second communication apparatus obtains second transmission control information by using a second resource of the third transmission control channel carrier, and obtains third transmission control information by using a third resource of the third transmission control channel carrier, where the second transmission control information is obtained by the first communication apparatus by encoding, based on a communication standard correspond-ing to the third transmission control channel carrier, the transmission control information corresponding to the first communication standard, and the third transmission control information is obtained by the first communication appara-tus by encoding, based on the communication standard corresponding to the third transmission control channel carrier, the transmission information corresponding to the second communication standard.

Based on the foregoing two possible designs, the first communication apparatus may encode transmission control information corresponding to communication standards sup-ported by the first communication apparatus, and send the transmission control information to the second communica-tion apparatus by using a same resource of the transmission control channel carrier. Alternatively, the first communica-tion apparatus may separately encode transmission control information corresponding to communication standards, and send the transmission control information to the second communication apparatus by using different resources. This is not limited.

According to a fifth aspect, an embodiment of this appli-cation provides a second communication apparatus. The second communication apparatus may implement functions performed by the second communication apparatus in the fourth aspect or the possible designs of the fourth aspect. The functions may be implemented by hardware by execut-ing corresponding software. The hardware or the software includes one or more modules corresponding to the func-tions, for example, a transceiver unit and a processing unit. The transceiver unit is configured to send first configuration information, and the processing unit is configured to per-form carrier aggregation communication on transmit carriers of different communication standards based on the first configuration information. The first configuration informa-tion indicates a first communication apparatus to perform carrier aggregation communication on at least two transmit carriers, the at least two transmit carriers include a first transmit carrier and a second transmit carrier, the first transmit carrier corresponds to a first communication stan-dard, the second transmit carrier corresponds to a second communication standard, and the first communication stan-dard is different from the second communication standard.

In a possible design, the first configuration information includes configuration information of at least two transmit standard carrier groups, where the configuration information of the transmit standard carrier group includes identification information of the transmit standard carrier group and identification information of at least one transmit carrier in the transmit standard carrier group, and the identification information of the transmit standard carrier group indicates a communication standard corresponding to the transmit standard carrier group.

In a possible design, the first configuration information includes identification information of at least two transmit standard carrier groups and identification information of at least one transmit carrier in the transmit standard carrier group, where the identification information of the transmit standard carrier group indicates a communication standard corresponding to the transmit standard carrier group.

In a possible design, the first configuration information includes identification information and standard information of the at least two transmit carriers, where the standard information indicates a communication standard of a trans-mit carrier corresponding to the identification information.

In a possible design, the first configuration information includes identification information of the at least two transmit carriers, and the identification information of the trans-mit carrier indicates a communication standard of the trans-mit carrier.

In a possible design, the transceiver unit is further con-figured to obtain capability information of the first commu-nication apparatus, where the capability information of the first communication apparatus indicates one or more of the following capabilities: a communication standard supported by the first communication apparatus, that the first commu-nication apparatus supports inter-radio access technology carrier aggregation RAT CA, that the first communication apparatus supports sounding reference signal SRS switching in the inter-RAT CA, that the first communication apparatus supports joint uplink control information UCI feedback in the inter-RAT CA, and that the first communication appa-ratus supports symbol-level dynamic power sharing in the inter-RAT CA.

In a possible design, the transceiver unit is further con-figured to send second configuration information, where the second configuration information includes configuration information of at least one SRS switching carrier group, each SRS switching carrier group indicates a transmit carrier before SRS switching and a transmit carrier after SRS switching, and a communication standard of the transmit carrier before SRS switching is different from a communi-cation standard of the transmit carrier after SRS switching.

In a possible design, the transceiver unit is further con-figured to send first scheduling information indicating the second transmit carrier.

In a possible design, the transceiver unit is further con-figured to send first control information, where the first control information indicates transmit power control TPC commands of the at least two transmit carriers.

In a possible design, the transceiver unit is further con-figured to send second control information and third control information, where the second control information indicates a transmit power control TPC command of a transmit carrier corresponding to the first communication standard, and the third control information indicates a TPC command of a transmit carrier corresponding to the second communication standard.

In a possible design, one or more of the following information corresponding to the second control information and the third control information is different: control infor-mation formats and RNTIs.

In a possible design, the transceiver unit is further con-figured to send third configuration information, where the third configuration information indicates a first transmission control channel carrier and a second transmission control channel carrier, the first transmission control channel carrier corresponds to the first communication standard, and the second transmission control channel carrier corresponds to the second communication standard. The transceiver unit is further configured to obtain, on the first transmission control channel carrier, transmission control information corre-sponding to the first communication standard. The trans-ceiver unit of the second communication apparatus is further configured to obtain, on the second transmission control channel carrier, transmission control information corre-sponding to the second communication standard.

In a possible design, the transceiver unit is further con-figured to obtain, on a third transmission control channel carrier, transmission control information corresponding to the first communication standard and transmission control information corresponding to the second communication standard, where the third transmission control channel carrier corresponds to the first communication standard or the second communication standard.

In a possible design, the transceiver unit is further configured to send third configuration information, where the third configuration information indicates the third transmission control channel carrier and a fourth transmission control channel carrier. The transceiver unit is further configured to send second scheduling information, where the second scheduling information indicates the third transmission control channel carrier.

In a possible design, the transceiver unit is further configured to send third configuration information, where the third configuration information indicates the third transmission control channel carrier.

In a possible design, the transceiver unit is further configured to obtain first transmission control information by using a first resource of the third transmission control channel carrier, where the first transmission control information is obtained by the first communication apparatus by encoding, based on a communication standard corresponding to the third transmission control channel carrier, the transmission control information corresponding to the first communication standard and the transmission control information corresponding to the second communication standard.

In a possible design, the transceiver unit is further configured to: obtain second transmission control information by using a second resource of the third transmission control channel carrier, and obtain third transmission control information by using a third resource of the third transmission control channel carrier, where the second transmission control information is obtained by the first communication apparatus by encoding, based on a communication standard corresponding to the third transmission control channel carrier, the transmission control information corresponding to the first communication standard, and the third transmission control information is obtained by the first communication apparatus by encoding, based on the communication standard corresponding to the third transmission control channel carrier, the transmission information corresponding to the second communication standard.

It should be noted that, for a specific implementation of the second communication apparatus in the fifth aspect, refer to behavior functions of the second communication apparatus in the communication method according to any one of the fourth aspect or the possible designs of the fourth aspect.

According to a sixth aspect, an embodiment of this application provides a second communication apparatus. The second communication apparatus may be the second communication apparatus, or a chip or a system on chip in the second communication apparatus. The second communication apparatus may implement functions performed by the second communication apparatus in the foregoing aspects or possible designs, and the functions may be implemented by hardware. In a possible design, the second communication apparatus may include a transceiver and a processor. The transceiver may be configured to support the second communication apparatus in implementing the functions in any one of the fourth aspect or the possible designs of the fourth aspect. For example, the transceiver may be configured to send first configuration information, and the processor may be configured to perform carrier aggregation communication on transmit carriers of different communication standards based on the first configuration information. The first configuration information indicates a first communication apparatus to perform carrier aggregation communication on at least two transmit carriers, the at least two transmit carriers include a first transmit carrier and a second transmit carrier, the first transmit carrier corresponds to a first communication standard, the second transmit carrier corresponds to a second communication standard, and the first communication standard is different from the second communication standard. In another possible design, the second communication apparatus may further include a memory. The memory is configured to store computer-executable instructions and data that are necessary for the second communication apparatus. When the second communication apparatus runs, the transceiver and the processor execute the computer-executable instructions stored in the memory, so that the second communication apparatus performs the communication method according to any one of the fourth aspect or the possible designs of the fourth aspect.

For a specific implementation of the second communication apparatus in the sixth aspect, refer to behavior functions of the second communication apparatus in the communication method according to any one of the fourth aspect or the possible designs of the fourth aspect.

According to a seventh aspect, a communication apparatus is provided. The communication apparatus includes one or more processors. The one or more processors are configured to run a computer program or instructions. When the one or more processors execute the computer program or the instructions, the communication apparatus is enabled to perform the communication method according to any one of the first aspect or the possible designs of the first aspect, or the communication method according to any one of the fourth aspect or the possible designs of the fourth aspect.

In a possible design, the communication apparatus further includes one or more memories, the one or more memories are coupled to the one or more processors, and the one or more memories are configured to store the foregoing computer program or instructions. In a possible implementation, the memory is located outside the communication apparatus. In another possible implementation, the memory is located inside the communication apparatus. In this embodiment of this application, the processor and the memory may alternatively be integrated into one component. In other words, the processor and the memory may alternatively be integrated together. In a possible implementation, the communication apparatus further includes a transceiver. The transceiver is configured to receive information and/or send information.

In a possible design, the communication apparatus further includes one or more communication interfaces, the one or more communication interfaces are coupled to the one or more processors, and the one or more communication interfaces are configured to communicate with a module other than the communication apparatus.

According to an eighth aspect, a communication apparatus is provided. The communication apparatus includes an input/output interface and a logic circuit. The input/output interface is configured to input and/or output information. The logic circuit is configured to perform the communication method according to any one of the first aspect or the possible designs of the first aspect or the communication method according to any one of the fourth aspect or the possible designs of the fourth aspect, and perform processing based on the information and/or generate the information. The information includes first configuration information, the first configuration information indicates a first communication apparatus to perform carrier aggregation communication on at least two transmit carriers, the at least two transmit carriers include a first transmit carrier and a second transmit carrier, the first transmit carrier corresponds to a first communication standard, the second transmit carrier corresponds to a second communication standard, and the first communication standard is different from the second communication standard.

According to a ninth aspect, a computer-readable storage medium is provided. The computer-readable storage medium stores computer instructions or a program. When the computer instructions or the program is run on a computer, the computer is enabled to perform the communication method according to any one of the first aspect or the possible designs of the first aspect, or the communication method according to any one of the fourth aspect or the possible designs of the fourth aspect.

According to a tenth aspect, a computer program product including computer instructions is provided. When the computer program product runs on a computer, the computer is enabled to perform the communication method according to any one of the first aspect or the possible designs of the first aspect, or the communication method according to any one of the fourth aspect or the possible designs of the fourth aspect.

According to an eleventh aspect, an embodiment of this application provides a computer program. When the computer program is run on a computer, the computer is enabled to perform the communication method according to any one of the first aspect or the possible designs of the first aspect, or the communication method according to any one of the fourth aspect or the possible designs of the fourth aspect.

For technical effects brought by any design manner of the seventh aspect to the eleventh aspect, refer to the technical effects brought by any possible design of the first aspect, or refer to the technical effects brought by any possible design of the fourth aspect. Details are not described.

According to a twelfth aspect, a communication system is provided. The communication system includes the first communication apparatus according to the second aspect or the third aspect and the second communication apparatus according to the fifth aspect or the sixth aspect.

BRIEF DESCRIPTION OF THE DRAWINGS

FIG. 10 is a flowchart of a communication method according to an embodiment of this application;

FIG. 11 is a flowchart of a communication method according to an embodiment of this application;

FIG. 12 is a flowchart of a communication method according to an embodiment of this application;

DETAILED DESCRIPTION OF ILLUSTRATIVE EMBODIMENTS

Before embodiments of this application are described, technical terms used in embodiments of this application are described.

A radio access technology (radio access technology, RAT) of a 4th generation (4th generation, 4G) communication system may be referred to as long term evolution (long term evolution, LTE). LTE is long term evolution of a universal mobile telecommunications system (universal mobile telecommunications system, UMTS) technical standard formulated by the 3rd generation partnership project (the 3rd generation partnership project, 3GPP) organization, and a network device of LTE may be referred to as an enhanced NodeB (enhanced NodeB, eNB).

A radio access technology of a 5th generation (5th generation, 5G) communication system may be referred to as a new radio access technology (new radio access technology in 3GPP, NR), or may be referred to as 5G-NR for short. A network device of NR may be referred to as a next generation NodeB (gNB).

For a future communication system (for example, a 6th generation (6th generation, 6G) communication system), a radio access technology may be a future radio access technology or the like.

A communication standard may be 2G, 3G, 4G, 5G, 6G, a future communication standard, or the like. 2G may also be described as global system for mobile communications (GSM), 3G may also be described as code division multiple access (CDMA), 4G may also be described as LTE, and 5G may also be described as NR. It should be noted that the communication standard may also be described as a network standard, or described as a mobile phone/terminal standard. This is not limited.

Carrier aggregation (carrier aggregation, CA) refers to a technology in which a plurality of component carriers (component carriers, CCs) are aggregated to achieve large transmission bandwidth and effectively improve uplink and downlink transmission rates. The carrier aggregation may include intra-band contiguous carrier aggregation, intra-band non-contiguous carrier aggregation, and inter-band non-contiguous carrier aggregation.

Figure 1:
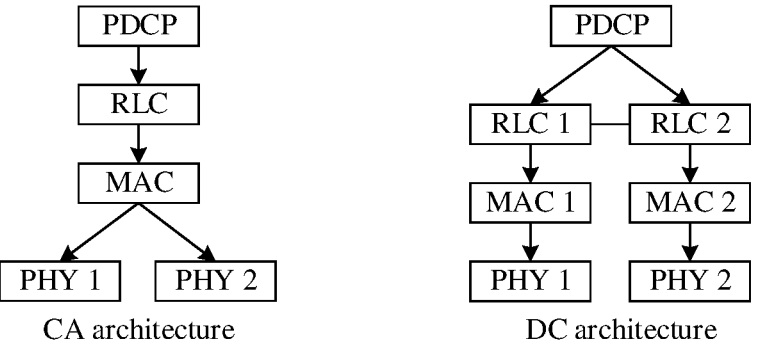
FIG. 1 is a schematic diagram of a CA architecture and a DC architecture according to an embodiment of this application.

For example, as shown in FIG. 1, a CA architecture may include a packet data convergence protocol (PDCP) layer, a radio link control (RLC) layer, a medium access control (MAC) layer, and a physical (PHY) layer. The CA may aggregate data at the MAC layer to implement joint scheduling.

Specifically, a terminal device or a network device may determine, based on a capability of the terminal device or the network device, a maximum quantity of carriers that can be simultaneously used for uplink/downlink transmission. The terminal device or the network device may aggregate a plurality of carriers into a wider spectrum based on the CA, and may also aggregate some non-contiguous spectrum fragments together, so that a requirement for spectrum compatibility of a communication system can be well met, a standardization process can be accelerated, and an existing communication apparatus and existing spectrum resources can be used to a maximum extent. The most intuitive advantage after the carrier aggregation is that a transmission speed is greatly improved and a delay is reduced. In addition, the carrier aggregation can efficiently improve network quality, improve a throughput, and balance network load, especially in heavy-load scenarios.

For example, when the terminal device accesses a 4G network, the network device may configure a 4G carrier for the terminal device; when the terminal device accesses a 5G network, the network device may configure a 5G carrier for the terminal device. In the CA, there may be one primary carrier or primary cell (primary cell, PCell) and one or more secondary carriers or secondary cells (secondary cells, SCells).

The CA may support one or more of the following configurations: a centralized scheduler, cross-carrier scheduling, a search space, a physical downlink control channel (PDCCH) blind detection capability, sounding reference signal (SRS) switching, joint uplink control information feedback (joint UCI feedback), and uplink power control.

For the centralized scheduler, the CA may implement multiple-input multiple-output (MIMO) layer quantity dynamic sharing and symbol-level dynamic power sharing among a plurality of carriers, and may jointly optimize resource configuration.

For the cross-carrier scheduling, the cross-carrier scheduling is relative to self-scheduling. The self-scheduling means that scheduling information of a carrier 1 is sent on the carrier 1, and scheduling information of a carrier 2 is sent on the carrier 2. The cross-carrier scheduling means that scheduling information of a carrier 1 may be sent on a carrier 2. Scheduling may include uplink data scheduling and/or downlink data scheduling.

Figure 2:
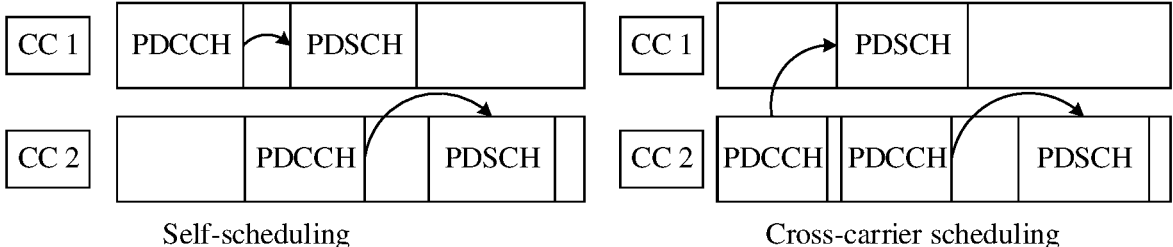
FIG. 2 is a schematic diagram of a scheduling policy according to an embodiment of this application.

For example, as shown in FIG. 2, for the self-scheduling, a PDCCH may be sent on a CC 1 to schedule a physical downlink shared channel (PDSCH) of the CC 1, and a PDCCH may be sent on a CC 2 to schedule a PDSCH of the CC 2; for the cross-carrier scheduling, a PDCCH may be sent on a CC 2 to schedule a PDSCH of a CC 1.

The network device may configure cross-carrier scheduling configuration information for the terminal device by using radio resource control (radio resource control, RRC) signaling, where the cross-carrier scheduling configuration information may indicate the self-scheduling (own) or the cross-carrier scheduling (other). When the cross-carrier scheduling configuration information indicates the cross-carrier scheduling, the cross-carrier scheduling configuration information may further include a scheduling cell identifier (scheduling cell ID) and carrier indicator field information (CIF-in scheduling cell) during scheduling. The terminal device may perform cross-carrier scheduling in a scheduling cell indicated by the scheduling cell identifier. The network device may further send downlink control information (DCI) including a 3-bit CIF to the terminal device. Through the cross-carrier scheduling, the terminal device can balance DCI load, flexibly coordinate resources, and improve spectral efficiency.

For the search space, the network device may configure a control channel resource set (CORESET) and the search space (SS) for the terminal device. For one search space set, the terminal device may detect a PDCCH candidate. One PDCCH candidate may include one or more control channel elements (CCEs), and an aggregation level L of the PDCCH candidate may indicate that the PDCCH candidate includes L CCEs. A value of L may be 1, 2, 4, 8, 16, 32, or the like.

For the cross-carrier scheduling in the CA, when calculating a number of a CCE included in a PDCCH candidate of a carrier, the terminal device may determine the number of the CCE of the PDCCH candidate based on a value of a CIF.

For the PDCCH blind detection capability, the PDCCH blind detection capability of the terminal device may include one or more of the following: a maximum quantity of PDCCH candidates blindly detected by the terminal device in one slot, a maximum quantity of non-overlapping CCEs blindly detected by the terminal device in one slot, a maximum quantity of PDCCH candidates blindly detected by the terminal device in a combination (X, Y), and a maximum quantity of non-overlapping CCEs blindly detected by the terminal device in a combination (X, Y).

For example, the combination (X, Y) may be a combination (2,2), (4,3), (7,3), or the like, where X may indicate that each span set includes X symbols, and an interval of any span set is within Y symbols. The combination may also be referred to as a span pattern (span pattern). Symbols of each combination do not overlap.

For example, a single cell is used as an example, and for different subcarrier spacings (subcarrier spacings, SCSs), maximum quantities of PDCCH candidates blindly detected in one slot are shown in Table 1, and maximum quantities of non-overlapping CCEs blindly detected in one slot are shown in Table 2, where p means that a subcarrier spacing is 2*15 kHz.

TABLE 1

| μ | Maximum quantity of PDCCH candidates blindly detected in one slot |
|---|---|
| 0 | 44 |
| 1 | 36 |
| 2 | 22 |
| 3 | 20 |

TABLE 2

| μ | Maximum quantity of non-overlapping CCEs blindly detected in one slot |
|---|---|
| 0 | 56 |
| 1 | 56 |
| 2 | 48 |
| 3 | 32 |

For another example, a single cell is used as an example, and for different subcarrier spacings (subcarrier spacings, SCSs), maximum quantities of PDCCH candidates blindly detected in a combination (X, Y) are shown in Table 3, and maximum quantities of non-overlapping CCEs blindly detected in a combination (X, Y) are shown in Table 4, where μ means that a subcarrier spacing is 2*15 kHz.

TABLE 3

| | Maximum quantity of PDCCH candidates blindly detected in (X, Y) | | |
|---|---|---|---|
| μ | (2, 2) | (4, 3) | (7, 3) |
| 0 | 14 | 28 | 44 |
| 1 | 12 | 24 | 36 |

TABLE 4

| | Maximum quantity of non-overlapping CCEs blindly detected in (X, Y) | | |
|---|---|---|---|
| μ | (2, 2) | (4, 3) | (7, 3) |
| 0 | 18 | 36 | 56 |
| 1 | 18 | 36 | 56 |

For the SRS switching, a time division duplex (time division duplex, TDD) asymmetric CA scenario is used as an example. It is assumed that a quantity of downlink carriers is greater than a quantity of uplink carriers. To optimize downlink scheduling, an SRS needs to be scheduled on a secondary component carrier (SCC) (SRS on a PUSCH-less carrier, in other words, there is no physical uplink shared channel (PUSCH) on the SCC). By sending the SRS, a base station may obtain downlink channel information, to perform downlink transmission more efficiently. When a capability of the terminal is limited, and the terminal can send an uplink signal only in one cell at a moment, the SRS switching is also required. The SRS switching can improve downlink transmission performance.

Figure 3:
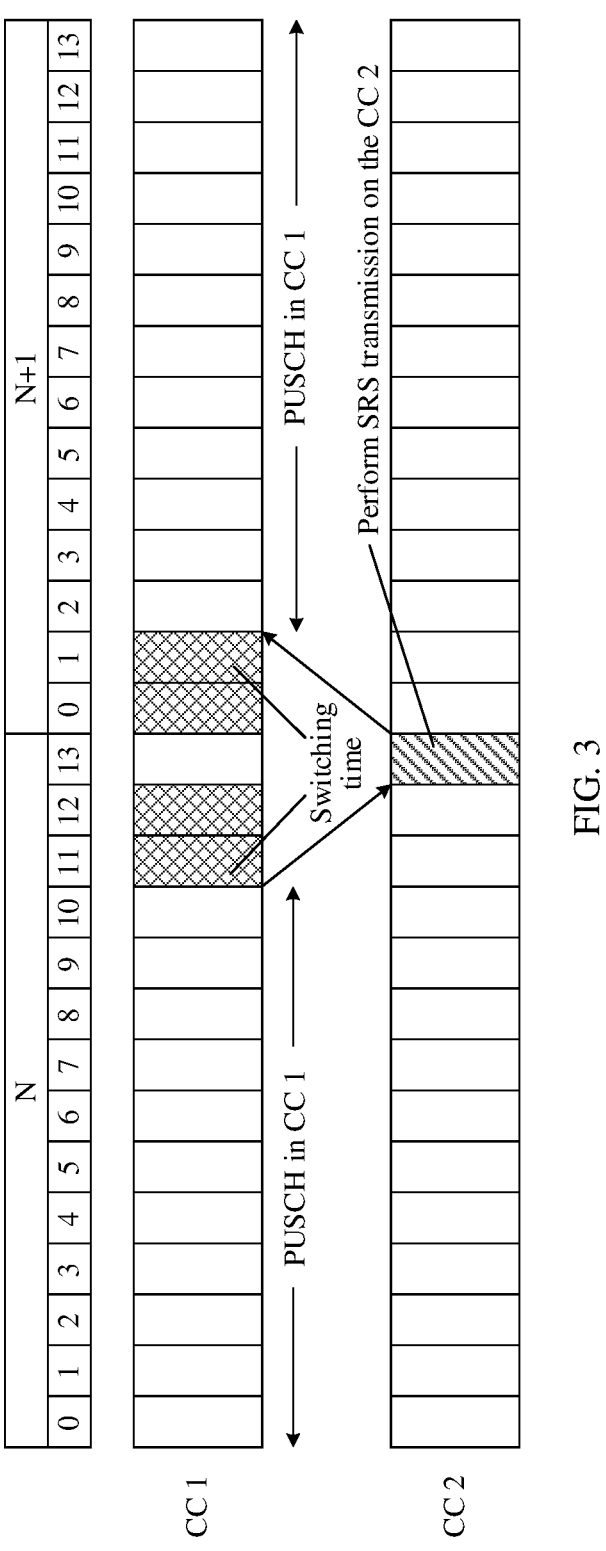
FIG. 3 is a schematic diagram of SRS switching according to an embodiment of this application.

For example, as shown in FIG. 3, the terminal device may schedule a PUSCH on the $0^{th}$ symbol to the $10^{th}$ symbol in an $N^{th}$ slot of a CC 1, perform SRS transmission on a CC 2 after switching time including the $11^{th}$ symbol and the $12^{th}$ symbol in the $N^{th}$ slot elapses, and schedule a PUSCH on the $2^{nd}$ symbol to the $13^{th}$ symbol in an $(N+1)^{th}$ slot of the CC 1 after switching time including the $0^{th}$ symbol and the $1^{st}$ symbol in the $(N+1)^{th}$ slot elapses.

For the joint uplink control information feedback, the terminal device may jointly encode acknowledgment (acknowledgment, ACK)/negative acknowledgment (negative acknowledgment, NACK) information of PDSCHs of a plurality of carriers and/or channel state information (channel state information, CSI) of the plurality of carriers to perform feedback on one carrier. The joint uplink control information feedback can reduce uplink feedback overhead resources, improve spectral efficiency, and improve uplink transmission performance.

For the uplink power control, symbol-level dynamic power sharing can be implemented between different carriers in the CA. The terminal device may determine a transmit power on each symbol based on a priority, and a high-priority channel on a high-priority carrier may be preferentially transmitted on each symbol. For priorities of carriers, a priority of the primary carrier may be higher than a priority of the secondary carrier, and a smaller cell index (index) indicates a higher priority. Channels with priorities in descending order may be sequentially: a physical random access channel (PRACH) of the primary cell, a physical uplink control channel (PUCCH)/PUSCH with a high-priority identifier (where in a case of a same priority identifier, a PUCCH with a HARQ-ACK, a PUCCH with CSI), an SRS (e.g., an aperiodic SRS, a semi-persistent SRS, a periodic SRS), and a PRACH in a non-PCell.

Dual connectivity (DC): The DC is an important technology introduced in the 3GPP Release-12. With the dual connectivity technology, LTE macro and small cells may use existing non-ideal backhaul (non-ideal backhaul) X2 interfaces to implement carrier aggregation, to provide higher rates for users, and improve spectral efficiency and balance load through macro/micro networking. A terminal device supporting the dual connectivity may be simultaneously connected to two LTE base stations, to increase a throughput of a single user. In a 5G network deployment process, a 5G cell may be used for macro coverage to implement independent networking, or may be used as a small cell to implement coverage and capacity enhancement of an existing LTE network. Regardless of which networking manner is used, the dual connectivity technology can be used to implement interconnection between an LTE system and a 5G system, to improve radio resource utilization of an entire mobile network system, reduce a communication system switching delay, and improve user and system performance.

For example, as shown in FIG. 1, a DC architecture may include a PDCP layer, an RLC layer, a MAC layer, and a PHY layer. The DC may perform data aggregation at the PDCP layer.

Specifically, for the DC, a network device may configure two cell groups for the terminal device. One is a master cell group (MCG), and the other is a secondary cell group (SCG). A primary cell in the master cell group is a PCell, and a primary cell in the secondary cell group is a primary secondary cell (PSCell). In the DC, a master station and a secondary station interact only at the RLC layer. Therefore, independent schedulers are used at the MAC layer. CA features are separately implemented in the two cell groups independently. The MCG and the SCG do not interact with each other.

It should be noted that the MCG and the SCG are concepts in the DC, and a cell group in which a cell in which the terminal device first initiates random access (RACH) is located may be determined as the MCG. If the DC is not performed, the concepts MCG and SCG do not exist. Alternatively, it may be understood that if the DC is not performed, the cell group may be considered as an MCG.

The MCG and the SCG may have a same communication standard, or may have different communication standards.

For example, when both the MCG and the SCG correspond to NR, the DC may be referred to as NR-DC. When the MCG corresponds to LTE and the SCG corresponds to NR, the DC may be referred to as EN-DC. When the MCG corresponds to NR and the SCG corresponds to LTE, the DC may be referred to as NE-DC.

The DC may support one or more of the following configurations: MIMO layer quantity allocation, power allocation, and a PDCCH blind detection capability.

For the MIMO layer quantity allocation, a quantity of MIMO layers can be semi-statically allocated in advance in the DC. For example, if the terminal device supports four MIMO layers, a maximum quantity of layers for the MCG may be 2, and a maximum quantity of layers for the SCG may be 2. However, it should be noted that, even if the SCG or the MCG has no data transmission, the MCG or the SCG also supports a maximum of two layers, and flexible dynamic allocation cannot be implemented. Consequently, performance is limited.

For the power allocation, the EN-DC and the NE-DC may support slot-level power sharing, and the NR-DC may support two slot-level power sharing manners: semi-static power sharing and dynamic power sharing.

For the slot-level power sharing supported by the EN-DC and the NE-DC, for the MCG, the network device may configure a maximum transmit power P_MCG for the terminal device, and for the SCG, the network device may configure a maximum transmit power P_SCG for the terminal device. If P1'+P2' is greater than a maximum transmit power of the terminal device in an overlapping slot, a power of the MCG or the SCG may be reduced based on priorities (for example, LTE transmission is preferentially ensured, in other words, a priority of LTE is greater than a priority of 5G), and it is ensured that P1' cannot be greater than P_MCG and P2' cannot be greater than P_SCG. P1' is a power of the MCG that needs to be transmitted in the slot, and P2' is a power of the SCG that needs to be transmitted in the slot.

For the slot-level semi-static power sharing supported by the NR-DC, the network device may configure P_MCG and P_SCG for the terminal device, where P_MCG+P_SCG<P_total, and P_total is a maximum transmit power of the terminal device. In a possible design, when the MCG and the SCG overlap in time domain in a slot, in the overlapping slot, a transmit power of the MCG is less than or equal to P_MCG, and a transmit power of the SCG is less than or equal to P_SCG. If the MCG and the SCG do not overlap in a slot, the maximum power depends on a communication transmission requirement, in other words, configuration of P_MCG and P_SCG may not be considered. In another possible design, regardless of whether time domain overlapping occurs in a slot, a transmit power of the MCG is less than or equal to P_MCG, and a transmit power of the SCG is less than or equal to P_SCG.

For the slot-level dynamic power sharing supported by the NR-DC, the network device may configure P_MCG and P_SCG for the terminal device. In a possible design, when the MCG and the SCG overlap in time domain in a slot, in the overlapping slot, a transmit power of the MCG is less than or equal to P_MCG, and a transmit power of the SCG is less than or equal to P_SCG. If the MCG and the SCG do not overlap in a slot, a maximum power depends on a communication transmission requirement, in other words, configuration of P_MCG and P_SCG may not be considered. In another possible design, if the terminal device has a look-head mechanism, the terminal device may determine whether overlapping exists in a slot, and the terminal device may preferentially transmit a power of the MCG, where a power of the SCG is min{P_SCG, P_total−transmit power of the MCG}.

For the PDCCH blind detection capability, when the DC is the NR-DC, PDCCH blind detection capabilities of the MCG and the SCG may be separately reported. The network device may separately configure quantities of PDCCHs for blind detection for the MCG and the SCG, and ensure that a sum of the two quantities is less than a reporting capability of the terminal device. When the DC is the EN-DC/NE-DC, the MCG and the SCG are completely independent.

In a communication system, some carriers support only LTE, and some carriers support only NR. To further improve a communication capacity of the communication system, an inter-radio access technology (inter-radio access technology, inter-RAT) communication mechanism (or may be described as a multi-RAT (multi-RAT, MR) communication mechanism) is provided. However, the CA supports only carrier aggregation on carriers of a same communication standard. In other words, when performing carrier aggregation, the terminal device or the network device can perform carrier aggregation communication only based on carriers of a same communication standard. In addition, in the DC, an inter-RAT communication mechanism on the MCG and the SCG may be supported through coordination between the MCG and the SCG, but independent schedulers are used in the DC. Consequently, flexible coordination between carriers of different RATs cannot be implemented, and spectral efficiency is reduced. In other words, the CA and the DC cannot well support the inter-RAT communication mechanism. As a result, a capacity of the communication system is limited, and communication performance of the communication system is affected.

To resolve this problem, embodiments of this application provide a communication method. A first communication apparatus obtains first configuration information, and performs carrier aggregation communication on at least two transmit carriers based on the first configuration information. The first configuration information indicates the first communication apparatus to perform carrier aggregation communication on the at least two transmit carriers, the at least two transmit carriers include a first transmit carrier and a second transmit carrier, the first transmit carrier corresponds to a first communication standard, the second transmit carrier corresponds to a second communication standard, and the first communication standard is different from the second communication standard. In embodiments of this application, the first communication apparatus may perform carrier aggregation communication on transmit carriers of different communication standards based on the first configuration information, so that an inter-RAT communication mechanism can be effectively supported, a capacity of a communication system can be improved, spectral efficiency can be improved, and communication performance of the communication system can be improved.

The following describes implementations of embodiments of this application in detail with reference to accompanying drawings in this specification.

The communication method provided in embodiments of this application may be applied to any communication system. The communication system may be a 3GPP communication system, for example, an LTE system, or may be an NR system or an NR vehicle to everything (vehicle to everything, V2X) system in 5G. Alternatively, the communication method may be applied to a hybrid networking system of LTE and 5G, a device-to-device (device-to-device, D2D) communication system, a machine-to-machine (machine-to-machine, M2M) communication system, an internet of things (IoT) system, a frequency division duplex (FDD) system, a time division duplex (TDD) system, a satellite communication system, another next-generation communication system (for example, a 6G system), or a non-3GPP communication system. This is not limited.

The communication method provided in embodiments of this application may be applied to various communication scenarios, for example, may be applied to one or more of the following communication scenarios: enhanced mobile broadband (eMBB), ultra-reliable low-latency communication (URLLC), machine type communication (MTC), IoT, narrowband internet of things (NB-IoT), customer premise equipment CPE), augmented reality (AR), virtual reality (VR), massive machine type communications (mMTC), D2D, V2X, vehicle-to-vehicle (V2V), and the like.

Embodiments of this application are applicable to both a homogeneous network scenario and a heterogeneous network scenario, and have no limitation on transmission points. Embodiments of this application may be applied to coordinated multipoint transmission between macro base stations, between micro base stations, and between a macro base station and a micro base station, and are applicable to a frequency division multiplexing system, a time division multiplexing system, a duplex system, an access and backhaul system, a relay system, and the like. Embodiments of this application are applicable to a low-frequency scenario (sub 6G), a high-frequency scenario (above 6G), terahertz, optical communication, and the like. This is not limited.

Figure 4:
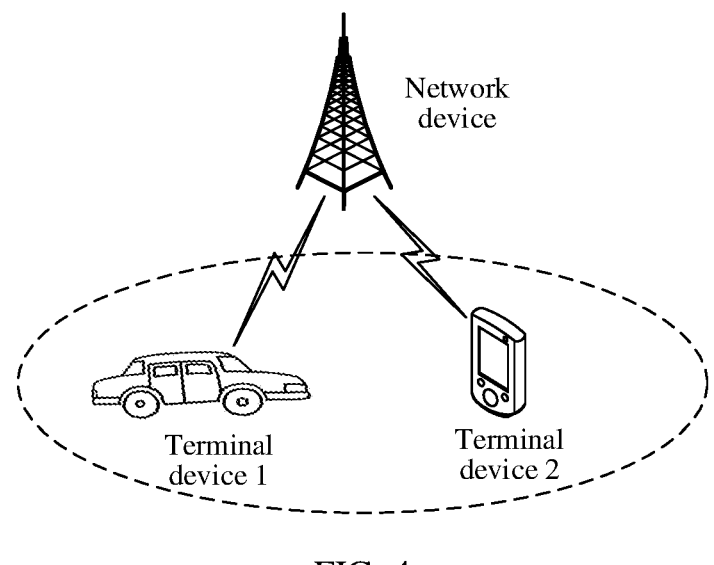
FIG. 4 is a schematic diagram of a communication system according to an embodiment of this application.

The following uses FIG. 4 as an example to describe the communication method provided in embodiments of this application.

FIG. 4 is a schematic diagram of a communication system according to an embodiment of this application. As shown in FIG. 4, the communication system may include a terminal device and a network device.

The terminal device in FIG. 4 may be located in cell coverage of the network device. The terminal device may communicate with the network device over an air interface by using an uplink (uplink, UL) or a downlink (downlink, DL). In a UL direction, the terminal device may send data to the network device by using a PUSCH. In a DL direction, the network device may send, to the terminal device, a PDCCH carrying DCI, or may send data to the terminal by using a PDSCH.

The terminal device may also perform sidelink communication or D2D communication with another terminal device by using a sidelink (SL), and send data to the another terminal device on the SL. For example, the terminal device sends sidelink data to the another terminal device on the SL by using a physical sidelink shared channel (PSSCH), and sends, to the another terminal device on the SL by using a physical sidelink feedback channel (PSFCH), sidelink feedback control information (SFCI) corresponding to received sidelink data. The D2D communication may include vehicle-to-vehicle communication, vehicle-to-pedestrian communication, vehicle-to-infrastructure communication, unmanned aerial vehicle (UAV) to unmanned aerial vehicle communication, and the like. This is not limited. It should be noted that in this embodiment of this application, the SL may also be referred to as a direct link, a PC5 interface link, or the like. This is not limited. The sidelink may also be referred to as a bylink.

Figure 5:
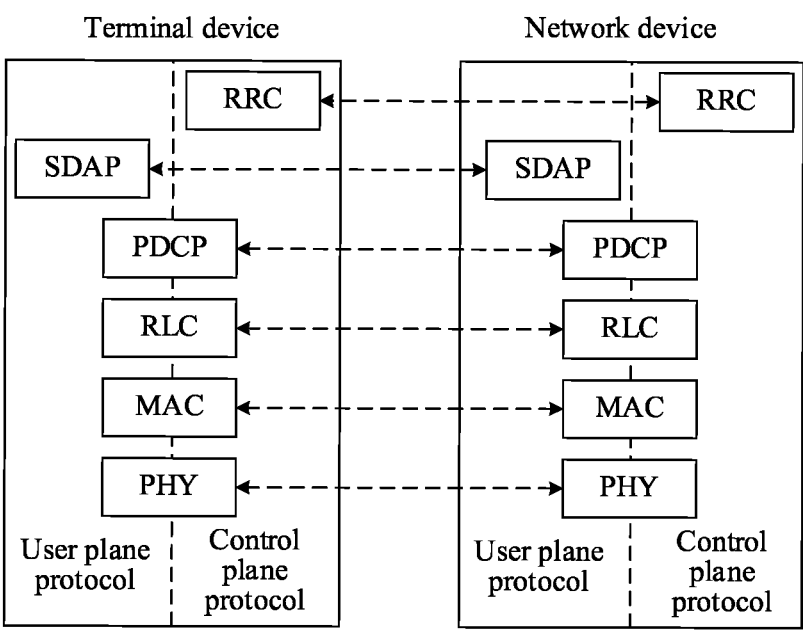
FIG. 5 is a schematic diagram of a protocol stack according to an embodiment of this application.

Specifically, as shown in FIG. 5, the terminal device may include a PHY layer, a MAC layer, an RLC layer, a PDCP layer, a service data adaptation protocol (service data adaptation protocol, SDAP) layer, and an RRC layer. The terminal device may include a user plane (user plane) protocol and a control plane (control plane) protocol.

For example, the terminal device in FIG. 4 may be referred to as a terminal, user equipment (UE), a mobile station (MS), a mobile terminal (MT), or the like, and may be a device that provides voice and/or data connectivity for a user. Specifically, the terminal device in FIG. 4 may be a mobile phone (mobile phone), an unmanned aerial vehicle, a tablet computer, a computer with a wireless transceiver function, a handheld device or a vehicle-mounted device with a wireless connection function, or the like. Alternatively, the terminal device may be a palmtop computer, a mobile internet device (MID), a wearable device, an eMBB terminal, a URLLC terminal, an MTC terminal, an NB-IoT terminal, a CPE terminal, a VR terminal, an AR terminal, a V2X terminal, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, a sensor, a cellular phone, a cordless phone, a session initiation protocol (SIP) phone, a wireless local loop (WLL) station, a personal digital assistant (PDA), a computing device or another processing device connected to a wireless modem, a vehicle-mounted terminal, a vehicle with a vehicle-to-vehicle (V2V) communication capability, an unmanned aerial vehicle with an unmanned aerial vehicle (UAV) to unmanned aerial vehicle communication capability, a terminal device in a 5G network, a terminal device in a future evolved public land mobile network (PLMN), or the like. This is not limited.

It should be noted that the terminal device and the user may be completely independent. For example, all information related to the user may be stored in a smart card (SIM), and the card may be used on the terminal device.

The network device in FIG. 4 may be any device that has a wireless transceiver function, and may be configured to be responsible for functions related to an air interface, for example, a radio link maintenance function, a radio resource management function, and some mobility management functions. The radio link maintenance function is used to maintain a radio link between the network device and the terminal device, and is responsible for protocol conversion between radio link data and internet protocol (IP) data. The radio resource management function may include functions such as radio link establishment and release, and radio resource scheduling and allocation. Some mobility management functions may include configuring the terminal device to perform measurement, evaluating radio link quality of the terminal device, determining handover of the terminal device between cells, and the like.

Specifically, a schematic diagram of a protocol stack of the network device may be shown in FIG. 5. The protocol stack of the network device may include a PHY layer, a MAC layer, an RLC layer, a PDCP layer, an SDAP layer, and an RRC layer. The protocol stack of the network device also includes a user plane protocol and a control plane protocol, and layers of the terminal device and the network device may be connected to each other for information transmission.

For example, the network device may be a device supporting wired access, or may be a device supporting wireless access. For example, the network device may be an access network (access network, AN)/radio access network (RAN) device, and includes a plurality of AN/RAN nodes. The AN/RAN node may be a NodeB (gNB) that continues to be evolved, a transmission reception point (TRP), an evolved NodeB (eNB), a radio network controller (RNC), a home base station (for example, a home evolved NodeB, or a home NodeB, HNB), a wireless fidelity (Wi-Fi) access point (AP), a wireless relay node, a wireless backhaul node, a transmission point (TP), a transmission reception point (TRP), or the like. Alternatively, the AN/RAN node may be a gNB or a transmission point (TRP or TP) in a 5G system, for example, an NR system, an antenna panel or a group of antenna panels of a base station in the 5G system, a network node, for example, a baseband unit (BBU) or a distributed unit (DU), that constitutes the gNB or the transmission point, a device that bears a base station function in D2D, V2X, or machine-to-machine (M2M) communication, a 6G base station, a base station in a future communication system, or the like.

The network device may provide a service for a cell, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell (metro cell), a micro cell, a pico cell, a femto cell, and the like. These small cells have characteristics of small coverage and a low transmit power, and are applicable to providing high-rate data transmission services.

It should be noted that the terminal device and the network device in this embodiment of this application each may be one or more chips, or may be a system on chip (SOC), or the like. FIG. 4 is merely an example figure, and a quantity of devices included in FIG. 4 is not limited. Names of devices and links in FIG. 4 are not limited. In addition to the names shown in FIG. 4, the devices and the links may further have other names. For example, the terminal device communicates with the network device through a user equipment (Uu) interface, and the UL may be further named "Uu link" or the like. This is not limited.

In this application, uplink may also be referred to as sending, and downlink may also be referred to as receiving.

Figure 6:
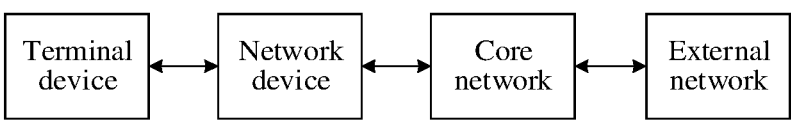
FIG. 6 is a schematic diagram of a communication system according to an embodiment of this application.

In addition, in addition to the devices shown in FIG. 4, as shown in FIG. 6, the communication system may further include a core network and/or an external network.

For example, a mobile network may be divided into three parts: a base station subsystem, a network subsystem, and a system support part. The network device may be located in the base station subsystem, and the core network may be located in the network subsystem.

Specifically, the core network may be configured to transmit call requests or data requests from air interfaces to different external networks. The core network may be used as an interface provided by a bearer network for the external network, and may provide functions such as user connection, user management, and bearer connection.

For example, user connection establishment may include functions such as mobility management (mobility management, MM), call management (call management, CM), switching/routing, and recording notification. The user management may include functions such as management of a user description, quality of service (quality of service, QoS), user communication accounting, a virtual home environment (VHE) (for example, providing the virtual home environment through a dialogue with an intelligent network platform), and security (for example, an authentication center provides corresponding security measures, including security management for a mobile service and security processing for external network access). The bearer connection (access to) includes functions such as connection to an external public switched telephone network (PSTN), an external circuit data network, an external packet data network, the internet, an enterprise intranet, and a short message service (SMS) server of the mobile network. Basic services provided by the core network may include mobile office, e-commerce, communication, an entertainment service, a travel and location-based service, a telemetry service, a simple message transfer service (monitoring and control), and the like.

As a core part of the communication system, the core network may play a role of connecting the foregoing and the following, and is mainly responsible for processing mobility management, session management, and data transmission (a core function) of the terminal device. Based on an evolved packet core (EPC), a 5G core network has three new enhancements: a service-based architecture, supporting network slicing, and separation of a control plane and a user plane. Compared with a 4G core network, the 5G core network evolves to a separated architecture again. The first one is separation of network functions, and a design idea of cloud-native network functions virtualization (NFV) is absorbed to establish a network in a software-based, modular, and service-oriented manner. The second one is the separation of the control plane and the user plane, so that user plane functions are not restricted by "centralization", and can be flexibly deployed in both the core network and an access network.

The external network may be an operator network that provides a data transmission service for the user, for example, an operator network that provides an IP multimedia service (IP multi-media service, IMS) for the user. An application server may be deployed in a DN, and the application server may provide a data transmission service for the user. Specifically, the operator may include a PLMN. The PLMN is a network established and operated by a government or an operator approved by the government to provide a land mobile communication service for the public, for example, may be China Mobile, China Unicom, or China Telecom.

Figure 7:
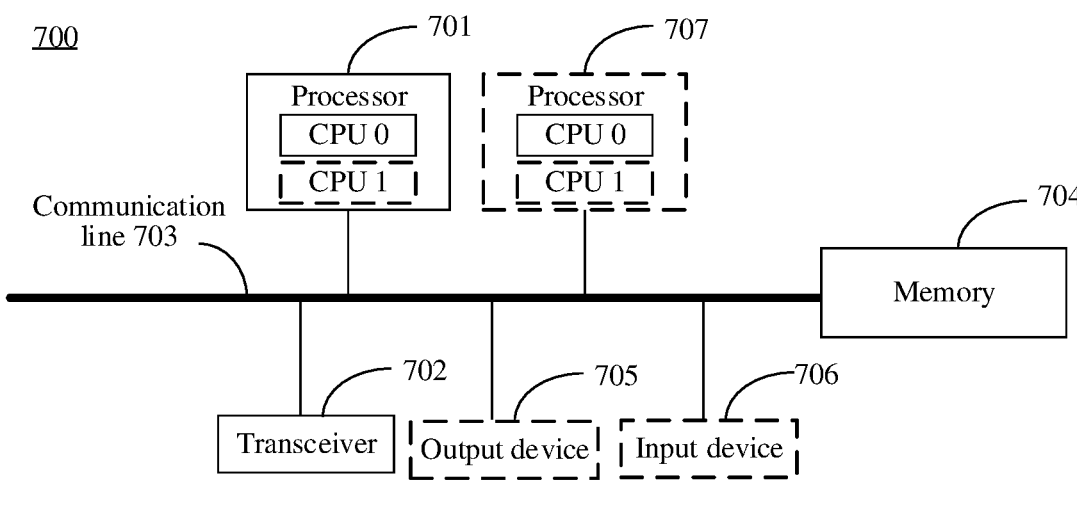
FIG. 7 is a diagram of a composition structure of a communication apparatus according to an embodiment of this application.

During specific implementation, as shown in FIG. 4, for example, each terminal device or each network device may use a composition structure shown in FIG. 7, or include components shown in FIG. 7. FIG. 7 is a schematic composition diagram of a communication apparatus 700 according to an embodiment of this application. The communication apparatus 700 may be a terminal device, a chip or a system on chip in the terminal device, a network device, or a chip or a system on chip in the network device. As shown in FIG. 7, the communication apparatus 700 includes a processor 701, a transceiver 702, and a communication line 703.

Further, the communication apparatus 700 may include a memory 704. The processor 701, the memory 704, and the transceiver 702 may be connected through the communication line 703.

The processor 701 is a central processing unit (central processing unit, CPU), a general-purpose processor, a network processor (network processor, NP), a digital signal processor (digital signal processor, DSP), a microprocessor, a microcontroller, a programmable logic device (programmable logic device, PLD), or any combination thereof. Alternatively, the processor 701 may be another apparatus having a processing function, for example, a circuit, a component, or a software module. This is not limited.

The transceiver 702 is configured to communicate with another device or another communication network. The another communication network may be an Ethernet, a radio access network (radio access network, RAN), a wireless local area network (wireless local area network, WLAN), or the like. The transceiver 702 may be a module, a circuit, a transceiver, or any apparatus that can implement communication.

The communication line 703 is configured to transmit information between the components included in the communication apparatus 700.

The memory 704 is configured to store instructions. The instructions may be a computer program.

The memory 704 may be a read-only memory (ROM) or another type of static storage device that can store static information and/or instructions; may be a random access memory (RAM) or another type of dynamic storage device that can store information and/or instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or the like. This is not limited.

It should be noted that the memory 704 may exist independently of the processor 701, or may be integrated with the processor 701. The memory 704 may be configured to store instructions, program code, some data, or the like. The memory 704 may be located inside the communication apparatus 700, or may be located outside the communication apparatus 700. This is not limited. The processor 701 is configured to execute the instructions stored in the memory 704, to implement a communication method provided in the following embodiment of this application.

In an example, the processor 701 may include one or more CPUs, for example, a CPU 0 and a CPU 1 in FIG. 7.

In an optional implementation, the communication apparatus 700 includes a plurality of processors. For example, in addition to the processor 701 in FIG. 7, the communication apparatus 700 may further include a processor 707.

In an optional implementation, the communication apparatus 700 further includes an output device 705 and an input device 706. For example, the input device 706 is a device, for example, a keyboard, a mouse, a microphone, or a joystick, and the output device 705 is a device, for example, a display or a speaker.

It should be noted that the communication apparatus 700 may be a desktop computer, a portable computer, a network server, a mobile phone, a tablet computer, a wireless terminal, an embedded device, a chip system, or a device having a structure similar to that in FIG. 7. In addition, the composition structure shown in FIG. 8 does not constitute a limitation on the communication apparatus. In addition to the components shown in FIG. 7, the communication apparatus may include more or fewer components than those shown in the figure, or some components may be combined, or different component arrangements may be used.

In this embodiment of this application, the chip system may include a chip, or may include a chip and another discrete component.

In addition, for actions, terms, and the like in embodiments of this application, refer to each other. This is not limited. In embodiments of this application, names of messages exchanged between devices, names of parameters in the messages, or the like are merely examples. Other names may alternatively be used during specific implementation. This is not limited.

The communication method shown in embodiments of this application may be applied to communication between the first communication apparatus and the second communication apparatus. The first communication apparatus may be a terminal device. The second communication apparatus may be a terminal device or a network device. It should be noted that the communication method shown in embodiments of this application may be applied to communication between a terminal device and a network device, or may be applied to communication between terminal devices.

The following describes the communication method provided in embodiments of this application with reference to the communication system shown in FIG. 4. The first communication apparatus may be any terminal device in the communication system, and the second communication apparatus may be any network device or any terminal device other than the first communication apparatus in the communication system. First communication apparatuses and second communication apparatuses in the following embodiments each may have the components shown in FIG. 7.

Figure 8:
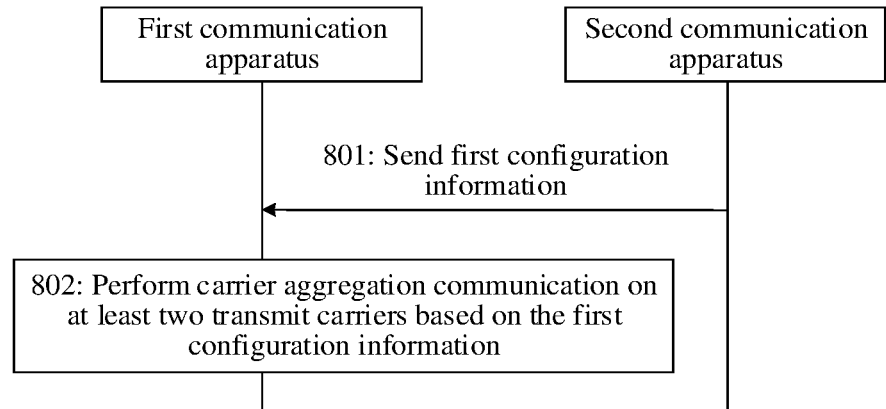
FIG. 8 is a flowchart of a communication method according to an embodiment of this application.

FIG. 8 is a flowchart of a communication method according to an embodiment of this application. As shown in FIG. 8, the method may include the following steps.

Step 801: A second communication apparatus sends first configuration information. Correspondingly, a first communication apparatus obtains the first configuration information.

Step 802: The first communication apparatus performs carrier aggregation communication on at least two transmit carriers based on the first configuration information.

The first configuration information may indicate the first communication apparatus to perform carrier aggregation communication on the at least two transmit carriers. The at least two transmit carriers may correspond to at least two communication standards. The transmit carrier may also be described as an uplink carrier, an uplink cell, or a cell.

For example, the at least two communication standards may be at least two of the following communication standards: 2G (or described as GSM), 3G (or described as CDMA), 4G (or described as LTE), 5G (or described as NR), 6G, and a future communication standard.

For example, the at least two transmit carriers include a first transmit carrier and a second transmit carrier. In this case, the first transmit carrier may correspond to a first communication standard, and the second transmit carrier may correspond to a second communication standard. The first communication standard is different from the second communication standard.

In another example, the at least two transmit carriers include a first transmit carrier, a second transmit carrier, and a third transmit carrier. In this case, the first transmit carrier may correspond to a first communication standard, the second transmit carrier may correspond to a second communication standard, and the third transmit carrier may also correspond to the second communication standard. The first communication standard is different from the second communication standard.

In still another example, the at least two transmit carriers include a first transmit carrier, a second transmit carrier, and a third transmit carrier. In this case, the first transmit carrier may correspond to a first communication standard, the second transmit carrier may correspond to a second communication standard, and the third transmit carrier may correspond to a third communication standard. The first communication standard is different from the second communication standard, and is also different from the third communication standard. The second communication standard is also different from the third communication standard.

Optionally, the at least two transmit carriers include one primary transmit carrier and one or more secondary transmit carriers.

The primary transmit carrier may be a transmit carrier used when the first communication apparatus accesses a network.

For example, the at least two transmit carriers include a transmit carrier whose communication standard is LTE, a transmit carrier whose communication standard is NR, and a transmit carrier whose communication standard is 6G. In this case, the primary transmit carrier may be the transmit carrier whose communication standard is LTE, and the secondary transmit carrier may be the transmit carrier whose communication standard is NR and/or the transmit carrier whose communication standard is 6G. Alternatively, the primary transmit carrier may be the transmit carrier whose communication standard is NR, and the secondary transmit carrier may be the transmit carrier whose communication standard is LTE and/or the transmit carrier whose communication standard is 6G. Alternatively, the primary transmit carrier may be the transmit carrier whose communication standard is 6G, and the secondary transmit carrier may be the transmit carrier whose communication standard is LTE and/or the transmit carrier whose communication standard is NR.

In a first possible design, the first configuration information includes configuration information of at least two transmit standard carrier groups.

The configuration information of the transmit standard carrier group (RAT-carrier group) may include identification information (RAT-carrier group index) of the transmit standard carrier group and identification information (carrier index) of at least one transmit carrier in the transmit standard carrier group.

The identification information of the transmit standard carrier group may indicate a communication standard corresponding to the transmit standard carrier group, and the transmit standard carrier group may also be described as a standard cell group (RAT-cell group).

Specifically, the second communication apparatus may configure the at least two transmit standard carrier groups for the first communication apparatus, where each transmit standard carrier group includes at least one transmit carrier, different transmit standard carrier groups correspond to different communication standards, and transmit carriers in a same transmit standard carrier group have a same communication standard.

For example, identification information of transmit standard carrier groups is 0, 1, and 2. In this case, a transmit standard carrier group 0 may include at least one transmit carrier whose communication standard is a first communication standard, a transmit standard carrier group 1 may include at least one transmit carrier whose communication standard is a second communication standard, and a transmit standard carrier group 2 may include at least one transmit carrier whose communication standard is a third communication standard.

For example, the transmit standard carrier group 0 may include at least one transmit carrier whose communication standard is LTE, the transmit standard carrier group 1 may include at least one transmit carrier whose communication standard is NR, and the transmit standard carrier group 2 may include at least one transmit carrier whose communication standard is 6G.

It should be noted that the identification information of the transmit carrier may be identification information of the transmit carrier in the transmit standard carrier group, in other words, identification information of transmit carriers in different transmit standard carrier groups may be the same. Alternatively, the identification information of the transmit carrier is globally unique, in other words, identification information of transmit carriers in different transmit standard carrier groups is different.

Optionally, when the second communication apparatus adds and/or deletes a secondary transmit carrier for the first communication apparatus, the second communication apparatus indicates, to the first communication device, identification information of the secondary transmit carrier and identification information of a transmit standard carrier group corresponding to the secondary transmit carrier, and the first communication apparatus determines a communication standard of the secondary transmit carrier based on the identification information of the transmit standard carrier group corresponding to the secondary transmit carrier.

Optionally, the second communication apparatus adds and/or deletes the secondary transmit carrier in configuration information of the transmit standard carrier group configured for the first communication apparatus, and the first communication apparatus determines, based on the configuration information of the transmit standard carrier group configured by the second communication apparatus, the communication standard of the transmit carrier configured by the second communication apparatus for the first communication apparatus.

Optionally, when the second communication apparatus sends DCI to the first communication apparatus to schedule data, the second communication apparatus indicates, to the first communication apparatus, a CIF carrying the identification information of the transmit standard carrier group and/or the identification information of the transmit carrier that are/is indicated in the configuration information of the transmit standard carrier group in the first configuration information.

For example, the CIF may indicate only the identification information of the transmit carrier, and the first communication apparatus determines a transmit carrier for communication based on the identification information of the transmit carrier indicated by the CIF.

For example, the CIF may indicate only the identification information of the transmit standard carrier group, and when one transmit standard carrier group includes one transmit carrier, the first communication apparatus may determine a transmit carrier for communication based on the identification information of the transmit standard carrier group indicated by the CIF.

For example, the CIF may indicate the identification information of the transmit carrier and the identification information of the transmit standard carrier group, and the first communication apparatus may determine a transmit carrier for communication based on the identification information of the transmit carrier and the identification information of the transmit standard carrier group that are indicated by the CIF.

The identification information of the transmit standard carrier group and the identification information of the transmit carrier may occupy one information field of the CIF, or may occupy two information fields of the CIF, to be specific, the identification information of the transmit standard carrier group occupies one information field of the CIF, and the identification information of the transmit carrier occupies the other information field of the CIF. This is not limited.

In a second possible design, the first configuration information includes identification information of at least two transmit standard carrier groups and identification information of at least one transmit carrier in the transmit standard carrier group.

Different from the first possible design in which the first configuration information includes the configuration information of the at least two transmit standard carrier groups, and the configuration information of the transmit standard carrier group includes the identification information of the transmit standard carrier group and the identification information of the at least one transmit carrier in the transmit standard carrier group, in this possible design, the second communication apparatus may also directly include the identification information of the at least two transmit standard carrier groups and the identification information of the at least one transmit carrier in the transmit standard carrier group in the first configuration information.

It should be noted that, for descriptions of the identification information of the at least two transmit standard carrier groups and the identification information of the at least one transmit carrier in the transmit standard carrier group in the second possible design, refer to the specific descriptions of the identification information of the at least two transmit standard carrier groups and the identification information of the at least one transmit carrier in the transmit standard carrier group in the first possible design. Details are not described again.

In a third possible design, the first configuration information includes identification information and standard information of the at least two transmit carriers.

The identification information of the transmit carrier may indicate the transmit carrier, and the standard information of the transmit carrier may indicate a communication standard of the transmit carrier. It should be noted that the identification information of the transmit carrier may be globally unique, in other words, identification information of different transmit carriers is different.

Optionally, when the second communication apparatus adds and/or deletes a secondary transmit carrier for the first communication apparatus, the second communication apparatus indicates identification information of the secondary transmit carrier and standard information of the secondary transmit carrier to the first communication apparatus.

Optionally, when the second communication apparatus sends DCI to the first communication apparatus to schedule data, the second communication apparatus indicates, to the first communication apparatus, a CIF carrying the identification information and/or the standard information of the transmit carrier that are/is indicated in the first configuration information.

For example, the CIF may indicate only the identification information of the transmit carrier, and the first communication apparatus determines a transmit carrier for communication based on the identification information of the transmit carrier indicated by the CIF.

For example, the CIF may indicate only the standard information of the transmit carrier, and when one communication standard corresponds to one transmit carrier, the first communication apparatus may determine a transmit carrier for communication based on the standard information indicated by the CIF.

For example, the CIF may indicate the identification information of the transmit carrier and the standard information of the transmit carrier, and the first communication apparatus may determine a transmit carrier for communication based on the identification information and the standard information of the transmit carrier that are indicated by the CIF.

The identification information of the transmit carrier and the standard information of the transmit carrier may occupy one information field of the CIF, or may occupy two information fields of the CIF, to be specific, the identification information of the transmit carrier occupies one information field of the CIF, and the standard information of the transmit carrier occupies the other information field of the CIF. This is not limited.

In a fourth possible design, the first configuration information includes identification information of the at least two transmit carriers.

The identification information of the transmit carrier may indicate a communication standard of the transmit carrier. It should be noted that the identification information of the transmit carrier may be globally unique, in other words, identification information of different transmit carriers is different.

For example, the first communication apparatus may determine the transmit carrier based on the identification information of the transmit carrier, and determine the communication standard of the transmit carrier based on a frequency band of the transmit carrier. It should be noted that the first possible design to the fourth possible design may alternatively be used in combination. In other words, the second communication apparatus may determine the first configuration information based on one or more of the first possible design to the fourth possible design, and send the first configuration information to the first communication apparatus. For example, the second communication apparatus sends the first configuration information to the first communication apparatus based on the first possible design and the third possible design. In this case, it is assumed that the at least two transmit carriers include at least one transmit carrier corresponding to a first communication standard and at least one transmit carrier corresponding to a second communication standard. The second communication apparatus may determine, based on the first possible design, first configuration information corresponding to the at least one transmit carrier corresponding to the first communication standard, determine, based on the third possible design, first configuration information of the at least one transmit carrier corresponding to the second communication standard, and send the first configuration information to the first communication apparatus.

For example, the second communication apparatus may determine, based on the first possible design, identification information of at least one transmit carrier corresponding to NR and identification information of a transmit standard carrier group corresponding to the transmit carrier that are configured for the first communication apparatus; determine, based on the third possible design, identification information and standard information of at least one transmit carrier corresponding to 6G that are configured for the first communication apparatus; include the identification information of the at least one transmit carrier corresponding to NR, the identification information of the transmit standard carrier group corresponding to the transmit carrier, and the identification information and the standard information of the at least one transmit carrier corresponding to 6G in the first configuration information; and send the first configuration information to the first communication apparatus.

Further, similar to that the first communication apparatus performs carrier aggregation communication on the at least two transmit carriers based on the first configuration information, the second communication apparatus may also perform carrier aggregation communication on the at least two transmit carriers based on the first configuration information. Details are not described.

It should be noted that, that the first communication apparatus performs carrier aggregation communication on the at least two transmit carriers may also be described as that the first communication apparatus performs transmit carrier aggregation communication on the at least two transmit carriers. When the second communication apparatus is a network device, that the first communication apparatus performs carrier aggregation communication on the at least two transmit carriers may also be described as that the first communication apparatus performs uplink carrier aggregation communication on the at least two transmit carriers.

Figure 9:
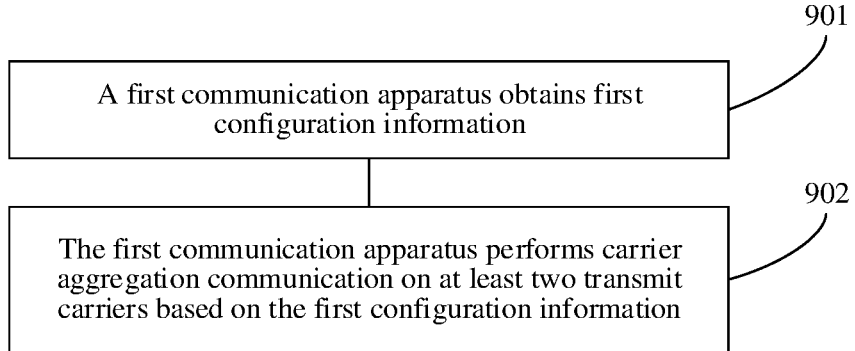
FIG. 9 is a flowchart of a communication method according to an embodiment of this application.

Based on the method shown in FIG. 8, alternatively, as shown in FIG. 9, the communication method provided in embodiments of this application may be described from a perspective of the first communication apparatus.

FIG. 9 is a flowchart of a communication method according to an embodiment of this application. As shown in FIG. 9, the method may include the following steps.

Step 901: A first communication apparatus obtains first configuration information.

Specifically, for specific descriptions of obtaining the first configuration information by the first communication apparatus, refer to related descriptions of obtaining the first configuration information by the first communication apparatus in step 801. Details are not described.

Step 902: The first communication apparatus performs carrier aggregation communication on at least two transmit carriers based on the first configuration information.

Specifically, for specific descriptions of performing, by the first communication apparatus, carrier aggregation communication on the at least two transmit carriers based on the first configuration information, refer to related descriptions of performing, by the first communication apparatus, carrier aggregation communication on the at least two transmit carriers based on the first configuration information in step 802. Details are not described.

Based on the methods shown in FIG. 8 and FIG. 9, alternatively, as shown in FIG. 10, the communication method provided in embodiments of this application may be described from a perspective of the second communication apparatus.

FIG. 10 is a flowchart of a communication method according to an embodiment of this application. As shown in FIG. 10, the method may include the following steps.

Step 1001: A second communication apparatus sends first configuration information.

Specifically, for specific descriptions of sending the first configuration information by the second communication apparatus, refer to related descriptions of sending the first configuration information by the second communication apparatus in step 801. Details are not described.

Further, FIG. 10 may include the following step 1002.

Step 1002: The second communication apparatus performs carrier aggregation communication on at least two transmit carriers based on the first configuration information.

Specifically, for specific descriptions of performing, by the second communication apparatus, carrier aggregation communication on the at least two transmit carriers based on the first configuration information, refer to related descriptions of performing, by the first communication apparatus, carrier aggregation communication on the at least two transmit carriers based on the first configuration information in step 802. Details are not described.

This embodiment of this application may be an independent embodiment, or may be combined with another embodiment of this application. Specifically, this is not limited in this application.

Based on the methods shown in FIG. 8 to FIG. 10, the first communication apparatus and the second communication apparatus may perform carrier aggregation communication on transmit carriers of different communication standards based on the first configuration information, so that an inter-RAT communication mechanism can be effectively supported, a capacity of a communication system can be improved, spectral efficiency can be improved, and communication performance of the communication system can be improved.

Based on the methods shown in FIG. 8 to FIG. 10, the second communication apparatus may further configure at least two receive carriers for the first communication apparatus, and the first communication apparatus may perform carrier aggregation communication based on the at least two receive carriers. For descriptions of the at least two receive carriers, refer to the foregoing descriptions of the at least two transmit carriers. Details are not described.

For example, the second communication apparatus may send fifth configuration information to the first communication apparatus. The fifth configuration information may indicate the first communication apparatus to perform carrier aggregation communication on the at least two receive carriers. The at least two receive carriers include a first receive carrier and a second receive carrier, the first receive carrier corresponds to a first communication standard, and the second receive carrier corresponds to a second communication standard.

In another example, the second communication apparatus may alternatively indicate at least two carriers to the first communication apparatus by using first configuration information. In other words, the second communication apparatus sends the first configuration information to the first communication apparatus, where the first configuration information may indicate the first communication apparatus to perform carrier aggregation communication on the at least two carriers. The at least two carriers include a first carrier and a second carrier, the first carrier corresponds to a first communication standard, and the second carrier corresponds to a second communication standard.

In the another example, the carrier may be a transmit carrier, or may be a receive carrier.

For example, the first carrier may be a transmit carrier, and the second carrier may be a receive carrier. Alternatively, the first carrier is both a transmit carrier and a receive carrier, and the second carrier is both a transmit carrier and a receive carrier.

Based on the methods shown in FIG. 8 to FIG. 10, as shown in FIG. 11, the first communication apparatus may further perform the following step 801*a*. It should be noted that, whether the following step 801*a* is performed before the foregoing step 801 is not limited. This embodiment of this application may be used in combination with the foregoing embodiments, or may be independent of the foregoing embodiments. This is not limited.

Step 801*a*: A first communication apparatus sends capability information of the first communication apparatus. Correspondingly, a second communication apparatus receives the capability information of the first communication apparatus.

The capability information of the first communication apparatus indicates one or more of the following capabilities: a communication standard supported by the first communication apparatus, that the first communication apparatus supports inter-RAT CA, that the first communication apparatus supports SRS switching in the inter-RAT CA, that the first communication apparatus supports joint UCI feedback in the inter-RAT CA, and that the first communication apparatus supports symbol-level dynamic power sharing in the inter-RAT CA. It should be noted that the SRS switching may also be described as SRS carrier switching or SRS transmit carrier switching. This is not limited.

The first communication apparatus may directly send the communication standard supported by the first communication apparatus to the second communication apparatus. Alternatively, the first communication apparatus may send identification information of the communication standard supported by the first communication apparatus to the second communication apparatus, to indicate the communication standard supported by the first communication apparatus to the second communication apparatus.

For example, the communication standard supported by the first communication apparatus includes LTE, NR, and 6G. In this case, the first communication apparatus may directly send LTE, NR, and 6G to the second communication apparatus, to indicate that the communication standard supported by the first communication apparatus includes LTE, NR, and 6G.

For another example, as shown in the following Table 5, identification information of LTE is 0, identification information of NR is 1, and identification information of 6G is 2. In this case, assuming that the communication standard supported by the first communication apparatus includes LTE, NR, and 6G, the first communication apparatus may send 0, 1, and 2 to the second communication apparatus, so that the second communication apparatus determines, based on 0, 1, and 2, that the communication standard supported by the first communication apparatus includes LTE, NR, and 6G.

TABLE 5

| Communication standard | Identification information |
|---|---|
| LTE | 0 |
| NR | 1 |
| 6G | 2 |

When the first communication apparatus supports the inter-RAT CA, the first communication apparatus may indicate, to the second communication apparatus, that the first communication apparatus supports the inter-RAT CA. When the first communication apparatus does not support the inter-RAT CA, the first communication apparatus may also indicate, to the second communication apparatus, that the first communication apparatus does not support the inter-RAT CA.

When the first communication apparatus supports the inter-RAT CA, the first communication apparatus may further indicate, to the second communication apparatus, whether the first communication apparatus supports performing sending based on the inter-RAT CA, and/or whether the first communication apparatus supports performing receiving based on the inter-RAT CA.

When the first communication apparatus supports performing sending based on the inter-RAT CA, the first communication apparatus may indicate, to the second communication apparatus, that the first communication apparatus supports performing sending based on the inter-RAT CA. When the first communication apparatus does not support performing sending based on the inter-RAT CA, the first communication apparatus may also indicate, to the second communication apparatus, that the first communication apparatus does not support performing sending based on the inter-RAT CA. Alternatively, the first communication apparatus may not need to indicate, to the second communication apparatus, whether the first communication apparatus supports performing sending based on the inter-RAT CA, so that the second communication apparatus considers by default that the first communication apparatus does not support performing sending based on the inter-RAT CA.

Alternatively, when the first communication apparatus supports the inter-RAT CA and supports performing sending based on the inter-RAT CA, the first communication apparatus may also indicate, to the second communication apparatus, that the first communication apparatus supports performing sending based on the inter-RAT CA, to indicate by default that the first communication apparatus supports the inter-RAT CA, so that the first communication apparatus may not need to indicate, to the second communication apparatus, that the first communication apparatus supports the inter-RAT CA, and therefore signaling overheads are reduced.

Similarly, for descriptions of indicating, by the first communication apparatus to the second communication apparatus, whether the first communication apparatus supports performing receiving based on the inter-RAT CA, refer to the foregoing specific descriptions of indicating, by the first communication apparatus to the second communication apparatus, whether the first communication apparatus supports performing sending based on the inter-RAT CA. Details are not described.

When the first communication apparatus supports the inter-RAT CA, the first communication apparatus may further indicate, to the second communication apparatus, whether the first communication apparatus supports the SRS switching in the inter-RAT CA.

When the first communication apparatus supports the SRS switching in the inter-RAT CA, the first communication apparatus may indicate, to the second communication apparatus, that the first communication apparatus supports the SRS switching in the inter-RAT CA. When the first communication apparatus does not support the SRS switching in the inter-RAT CA, the first communication apparatus may also indicate, to the second communication apparatus, that the first communication apparatus does not support the SRS switching in the inter-RAT CA. Alternatively, the first communication apparatus may not need to indicate, to the second communication apparatus, whether the first communication apparatus supports the SRS switching in the inter-RAT CA, so that the second communication apparatus considers by default that the first communication apparatus does not support the SRS switching in the inter-RAT CA.

Alternatively, when the first communication apparatus supports the inter-RAT CA and supports the SRS switching in the inter-RAT CA, the first communication apparatus may also indicate, to the second communication apparatus, that the first communication apparatus supports the SRS switching in the inter-RAT CA, to indicate by default that the first communication apparatus supports the inter-RAT CA, so that the first communication apparatus may not need to indicate, to the second communication apparatus, that the first communication apparatus supports the inter-RAT CA, and therefore signaling overheads are reduced.

When the first communication apparatus supports the SRS switching in the inter-RAT CA, the first communication apparatus may further indicate, to the second communication apparatus, whether the first communication apparatus supports SRS switching in a same transmit standard carrier group, and/or whether the first communication apparatus supports SRS switching between different transmit standard carrier groups.

The SRS switching in a same transmit standard carrier group may indicate to perform SRS switching between at least two carriers corresponding to a same transmit standard carrier group. The SRS switching between different transmit standard carrier groups may indicate to perform SRS switching between at least two carriers corresponding to different transmit standard carrier groups.

When the first communication apparatus supports the SRS switching in a same transmit standard carrier group, the first communication apparatus may indicate, to the second communication apparatus, that the first communication apparatus supports the SRS switching in a same transmit standard carrier group. When the first communication apparatus does not support the SRS switching in a same transmit standard carrier group, the first communication apparatus may also indicate, to the second communication apparatus, that the first communication apparatus does not support the SRS switching in a same transmit standard carrier group.

Alternatively, the first communication apparatus may not need to indicate, to the second communication apparatus, whether the first communication apparatus supports the SRS switching in a same transmit standard carrier group, so that the second communication apparatus considers by default that the first communication apparatus does not support the SRS switching in a same transmit standard carrier group.

Alternatively, when the first communication apparatus supports the SRS switching in the inter-RAT CA and supports the SRS switching in a same transmit standard carrier group, the first communication apparatus may indicate, to the second communication apparatus, that the first communication apparatus supports the SRS switching in a same transmit standard carrier group, to indicate by default that the first communication apparatus supports the SRS switching in the inter-RAT CA, so that the first communication apparatus may not need to indicate, to the second communication apparatus, that the first communication apparatus supports the SRS switching in the inter-RAT CA, and therefore signaling overheads are reduced.

Similarly, for descriptions of indicating, by the first communication apparatus to the second communication apparatus, whether the first communication apparatus supports the SRS switching between different transmit standard carrier groups, refer to the foregoing specific descriptions of indicating, by the first communication apparatus to the second communication apparatus, whether the first communication apparatus supports the SRS switching in a same transmit standard carrier group. Details are not described.

When the first communication apparatus supports the inter-RAT CA, the first communication apparatus may further indicate, to the second communication apparatus, whether the first communication apparatus supports the joint UCI feedback in the inter-RAT CA. When the first communication apparatus supports the joint UCI feedback in the inter-RAT CA, the first communication apparatus may further indicate, to the second communication apparatus, whether the first communication apparatus supports joint UCI feedback in a same transmit standard carrier group, and/or whether the first communication apparatus supports joint UCI feedback between different transmit standard carrier groups.

Similarly, for descriptions of indicating, by the first communication apparatus to the second communication apparatus, whether the first communication apparatus supports the joint UCI feedback in the inter-RAT CA, whether the first communication apparatus supports the joint UCI feedback in a same transmit standard carrier group, and whether the first communication apparatus supports the joint UCI feedback between different transmit standard carrier groups, refer to the foregoing related descriptions of indicating whether the first communication apparatus supports the SRS switching in the inter-RAT CA, whether the first communication apparatus supports the SRS switching in a same transmit standard carrier group, and whether the first communication apparatus supports the SRS switching between different transmit standard carrier groups. Details are not described.

When the first communication apparatus supports the inter-RAT CA, the first communication apparatus may further indicate, to the second communication apparatus, whether the first communication apparatus supports the symbol-level dynamic power sharing in the inter-RAT CA. When the first communication apparatus supports the symbol-level dynamic power sharing in the inter-RAT CA, the first communication apparatus may further indicate, to the second communication apparatus, whether the first communication apparatus supports symbol-level dynamic power sharing in a same transmit standard carrier group, and/or whether the first communication apparatus supports symbol-level dynamic power sharing between different transmit standard carrier groups.

Similarly, for descriptions of indicating, by the first communication apparatus to the second communication apparatus, whether the first communication apparatus supports the symbol-level dynamic power sharing in the inter-RAT CA, whether the first communication apparatus supports the symbol-level dynamic power sharing in a same transmit standard carrier group, and whether the first communication apparatus supports the symbol-level dynamic power sharing between different transmit standard carrier groups, refer to the foregoing related descriptions of indicating whether the first communication apparatus supports the SRS switching in the inter-RAT CA, whether the first communication apparatus supports the SRS switching in a same transmit standard carrier group, and whether the first communication apparatus supports the SRS switching between different transmit standard carrier groups. Details are not described.

Based on the methods shown in FIG. 8 to FIG. 11, as shown in FIG. 12, when the first communication apparatus supports the SRS switching in the inter-RAT CA, the first communication apparatus and the second communication apparatus may further communicate according to a method shown in FIG. 12. This embodiment of this application may be used in combination with the foregoing embodiments, or may be independent of the foregoing embodiments. This is not limited.

FIG. 12 shows a communication method according to an embodiment of this application. As shown in FIG. 12, the method may include the following steps.

Step 1201: A second communication apparatus sends second configuration information. Correspondingly, a first communication apparatus obtains the second configuration information.

The second configuration information includes configuration information of at least one SRS switching carrier group, and each SRS switching carrier group indicates a transmit carrier before SRS switching and a transmit carrier after SRS switching.

For example, the configuration information of the SRS switching carrier group may include identification information of a transmit carrier before SRS switching, identification information of a transmit standard carrier group corresponding to the transmit carrier, identification information of a transmit carrier after SRS switching, and identification information of a transmit standard carrier group corresponding to the transmit carrier, so that the first communication apparatus determines the transmit carrier before SRS switching and the transmit carrier after SRS switching based on identification information of the transmit carriers and identification information of transmit standard carrier groups corresponding to the transmit carriers.

The identification information of the transmit carrier may be identification information of the transmit carrier in the transmit standard carrier group. Alternatively, the identification information of the transmit carrier is globally unique.

In another example, the configuration information of the SRS switching carrier group may include identification information and standard information of a transmit carrier before SRS switching, and identification information and standard information of a transmit carrier after SRS switching, so that the first communication apparatus determines the transmit carrier before SRS switching and the transmit carrier after SRS switching based on identification information and standard information of the transmit carriers.

The identification information of the transmit carrier may be globally unique.

In still another example, the configuration information of the SRS switching carrier group may include identification information of a transmit carrier before SRS switching and identification information of a transmit carrier after SRS switching, so that the first communication apparatus determines the transmit carrier before SRS switching and the transmit carrier after SRS switching based on identification information of the transmit carriers.

The identification information of the transmit carrier may be globally unique.

It should be noted that a communication standard of the transmit carrier before SRS switching may be the same as or different from a communication standard of the transmit carrier after SRS switching. When the communication standard of the transmit carrier before SRS switching is the same as the communication standard of the transmit carrier after SRS switching, the SRS switching may also be described as SRS switching in a same transmit standard carrier group. When the communication standard of the transmit carrier before SRS switching is different from the communication standard of the transmit carrier after SRS switching, the SRS switching may also be described as SRS switching between different transmit standard carrier groups.

Step 1202: The second communication apparatus sends first scheduling information. Correspondingly, the first communication apparatus obtains the first scheduling information.

The first scheduling information may indicate a to-be-switched transmit carrier.

For example, the first scheduling information may include identification information of the to-be-switched transmit carrier and identification information of a transmit standard carrier group corresponding to the transmit carrier, so that the first communication apparatus determines the to-be-switched transmit carrier based on the identification information of the transmit carrier and the identification information of the transmit standard carrier group corresponding to the transmit carrier.

In another example, the first scheduling information may include identification information and standard information of the to-be-switched transmit carrier, so that the first communication apparatus determines the to-be-switched transmit carrier based on the identification information and the standard information of the transmit carrier.

In still another example, the first scheduling information may include identification information of the to-be-switched transmit carrier, so that the first communication apparatus determines the to-be-switched transmit carrier based on the identification information of the transmit carrier.

Step 1203: The first communication apparatus switches, based on the first scheduling information, from a transmit carrier for receiving the first scheduling information to the transmit carrier indicated by the first scheduling information.

For example, the transmit carrier on which the first communication apparatus receives the first scheduling information is a first transmit carrier, and the transmit carrier indicated by the first scheduling information is a second transmit carrier. In this case, the first communication apparatus may switch from the first transmit carrier to the second transmit carrier based on the first scheduling information.

The transmit carrier for receiving the first scheduling information may be a transmit carrier that the first communication apparatus works on or activates at a moment of receiving the first scheduling information, or the transmit carrier for receiving the first scheduling information may be a transmit carrier corresponding to a receive carrier on which the first scheduling information is located. For example, there may be a correspondence between a receive carrier and a transmit carrier, and the transmit carrier for receiving the first scheduling information is determined based on the receive carrier on which the first scheduling information is located and the correspondence.

Figure 13:
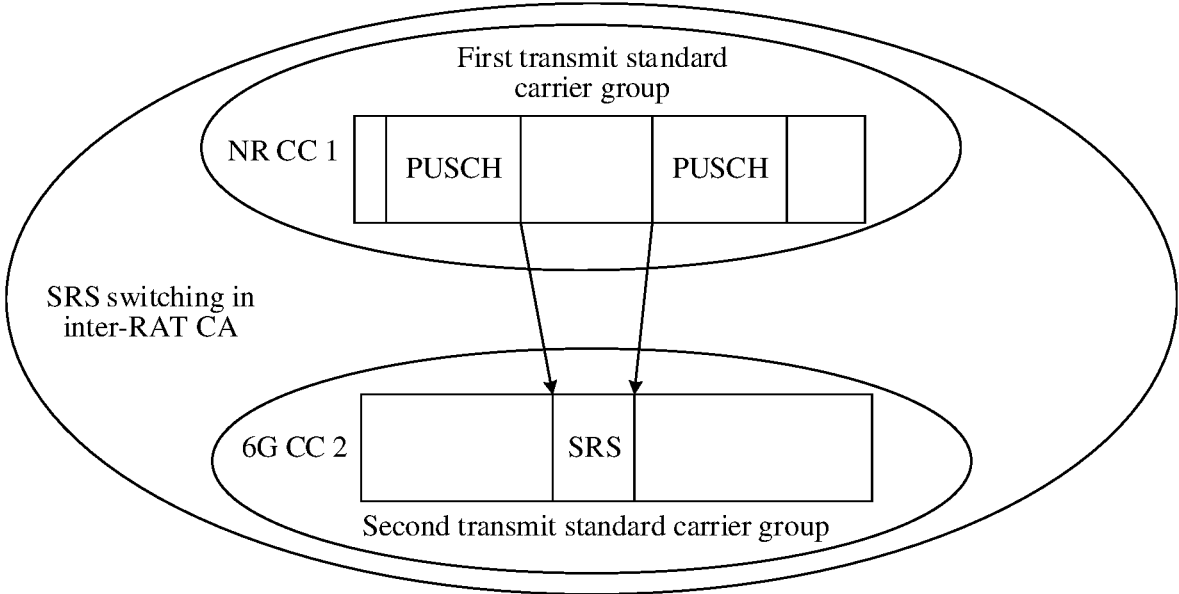
FIG. 13 is a schematic diagram of SRS switching in inter-RAT CA according to an embodiment of this application.

For example, as shown in FIG. 13, the first communication apparatus transmits a PUSCH on an NR CC 1. In this case, to measure channel information of a 6G CC 2, the second communication apparatus may send first scheduling information to the first communication apparatus, so that the first communication apparatus switches from the NR CC 1 to the 6G CC 2, and sends an SRS on the 6G CC 2. After sending the SRS, the first communication apparatus may switch to the NR CC 1 to transmit the PUSCH.

Further, the second communication apparatus may further indicate, to the first communication apparatus by using control information, a transmit power control (transmit power control, TPC) command corresponding to each of at least two transmit carriers, so that the first communication apparatus determines a transmit power of each transmit carrier based on the control information.

The TPC command of the transmit carrier may correspond to a bit block in the control information. The control information may be DCI, or may be control information in a future communication system, for example, reception control information (reception control information, RxCI). This is not limited.

It should be noted that when the control information indicates an SRS switching power of the transmit carrier, the second communication apparatus may perform cyclic redundancy code (cyclic redundancy code, CRC) scrambling on the control information by using a radio network temporary identifier (radio network temporary identifier, RNTI), and send the scrambled control information to the first communication apparatus.

The RNTI may be a transmission power command SRS-RNTI (transmission power command SRS-RNTI, TPC-SRS-RNTI).

It should be noted that when the control information indicates a PUSCH power of the transmit carrier, the second communication apparatus may perform CRC scrambling on the control information by using an RNTI, and send the scrambled control information to the first communication apparatus.

The RNTI may be a transmission power command PUSCH-RNTI (transmission power command PUSCH-RNTI, TPC-PUSCH-RNTI).

It should be noted that when the control information indicates a PUCCH power of the transmit carrier, the second communication apparatus may perform CRC scrambling on the control information by using an RNTI, and send the scrambled control information to the first communication apparatus.

The RNTI may be a transmission power command PUCCH-RNTI (transmission power command PUCCH-RNTI, TPC-PUCCH-RNTI).

In a possible design, the second communication apparatus sends, to the first communication apparatus by using one piece of control information, TPC commands of transmit carriers corresponding to different communication standards.

For example, the second communication apparatus may send first control information to the first communication apparatus, where the first control information may indicate TPC commands of the at least two transmit carriers.

In another possible design, the second communication apparatus sends, to the first communication apparatus by using different control information, TPC commands of transmit carriers corresponding to different communication standards.

For example, the first communication apparatus supports a first communication standard and a second communication standard. In this case, the second communication apparatus may send second control information and third control information to the first communication apparatus, where the second control information indicates a transmit power control TPC command of a transmit carrier corresponding to the first communication standard, and the third control information indicates a TPC command of a transmit carrier corresponding to the second communication standard.

Based on the foregoing two possible designs, the first communication apparatus may determine, based on identification information of a transmit standard carrier group corresponding to each of the at least two transmit carriers and identification information of each transmit carrier, a location of the TPC command of each transmit carrier in the control information corresponding to the transmit carrier.

Optionally, the second communication apparatus may determine, based on the identification information of the transmit standard carrier group corresponding to each of the at least two transmit carriers and the identification information of each transmit carrier, the location of the TPC command of each transmit carrier in the control information corresponding to the transmit carrier.

For example, the second communication apparatus may send the first control information to the first communication apparatus after sequentially including TPC commands of transmit carriers of transmit standard carrier groups in the first control information in ascending order of identification information of the transmit standard carrier groups and identification information of the transmit carriers, for example, first arranging the transmit standard carrier groups in ascending order of the identification information of the transmit standard carrier groups, and for a plurality of carriers in a same transmit standard carrier group, arranging the carriers in ascending order of the identification information of the transmit carriers. After obtaining the first control information, the first communication apparatus may sequentially determine the TPC commands of the transmit carriers of the transmit standard carrier groups in ascending order of the identification information of the transmit standard carrier groups and the identification information of the transmit carriers.

For another example, the second communication apparatus may send the second control information to the first communication apparatus after sequentially including TPC commands of transmit carriers of transmit standard carrier groups corresponding to the first communication standard in the second control information in ascending order of identification information of the transmit standard carrier groups and identification information of the transmit carriers, for example, first arranging the transmit standard carrier groups in ascending order of the identification information of the transmit standard carrier groups, and for a plurality of carriers in a same transmit standard carrier group, arranging the carriers in ascending order of the identification information of the transmit carriers. After obtaining the second control information, the first communication apparatus may sequentially determine the TPC commands of the transmit carriers of the transmit standard carrier groups corresponding to the first communication standard in ascending order of the identification information of the transmit standard carrier groups and the identification information of the transmit carriers.

For still another example, the second communication apparatus may send the third control information to the first communication apparatus after sequentially including TPC commands of transmit carriers of transmit standard carrier groups corresponding to the second communication standard in the third control information in ascending order of identification information of the transmit standard carrier groups and identification information of the transmit carriers, for example, first arranging the transmit standard carrier groups in ascending order of the identification information of the transmit standard carrier groups, and for a plurality of carriers in a same transmit standard carrier group, arranging the carriers in ascending order of the identification information of the transmit carriers. After obtaining the third control information, the first communication apparatus may sequentially determine the TPC commands of the transmit carriers of the transmit standard carrier groups corresponding to the second communication standard in ascending order of the identification information of the transmit standard carrier groups and the identification information of the transmit carriers.

In another example, the first communication apparatus may determine, based on identification information of each of the at least two transmit carriers, a location of the TPC command of each transmit carrier in the control information corresponding to the transmit carrier.

Optionally, the second communication apparatus may determine, based on the identification information of each of the at least two transmit carriers, the location of the TPC command of each transmit carrier in the control information corresponding to the transmit carrier.

For example, the second communication apparatus may sequentially include the TPC commands of the at least two transmit carriers in the first control information in ascending order of identification information of the transmit carriers, and send the first control information to the first communication apparatus. After obtaining the first control information, the first communication apparatus may sequentially determine the TPC commands of the at least two transmit carriers in ascending order of the identification information of the transmit carriers.

For another example, the second communication apparatus may sequentially include TPC commands of transmit carriers corresponding to the first communication standard in the second control information in ascending order of identification information of the transmit carriers, and send the second control information to the first communication apparatus. After obtaining the second control information, the first communication apparatus may sequentially determine the TPC commands of the transmit carriers corresponding to the first communication standard in ascending order of the identification information of the transmit carriers.

For still another example, the second communication apparatus may sequentially include TPC commands of transmit carriers corresponding to the second communication standard in the third control information in ascending order of identification information of the transmit carriers, and send the third control information to the first communication apparatus. After obtaining the third control information, the first communication apparatus may sequentially determine the TPC commands of the transmit carriers corresponding to the second communication standard in ascending order of the identification information of the transmit carriers.

In still another example, the second communication apparatus may send fourth configuration information to the first communication apparatus. The fourth configuration information may indicate a location of the TPC command of each transmit carrier in the control information corresponding to the transmit carrier. The first communication apparatus may determine, based on the fourth configuration information, the location of the TPC command of each transmit carrier in the control information corresponding to the transmit carrier.

The location of the TPC command of the transmit carrier in the corresponding control information may be a location of a bit block occupied by the TPC command in the control information, for example, an $X^{th}$ bit block. In this case, the fourth configuration information may indicate information about X. Alternatively, the location of the TPC command of the transmit carrier in the corresponding control information may be a location of a bit occupied by the TPC command in the control information, for example, a $Y1^{th}$ bit to a $Y2^{th}$ bit. In this case, the fourth configuration information may indicate a start bit and/or a quantity of bits.

For example, the second communication apparatus may send fourth configuration information to the first communication apparatus. The fourth configuration information may indicate a location of a TPC command of each transmit carrier in the first control information. The first communication apparatus may determine, based on the fourth configuration information, the location of the TPC command of each transmit carrier in the first control information.

For another example, the second communication apparatus may send fourth configuration information to the first communication apparatus. The fourth configuration information may indicate a location of a TPC command of a transmit carrier corresponding to the first communication standard in the second control information and a location of a TPC command of a transmit carrier corresponding to the second communication standard in the third control information. The first communication apparatus may determine, based on the fourth configuration information, the location of the TPC command of the transmit carrier corresponding to the first communication standard in the second control information and the location of the TPC command of the transmit carrier corresponding to the second communication standard in the third control information.

It should be noted that when the second communication apparatus sends, to the first communication apparatus by using different control information, TPC commands of transmit carriers corresponding to different communication standards, one or more of the following information corresponding to the different control information may be different: control information formats and RNTIs.

For example, one or more of the following information corresponding to the second control information and the third control information may be different: control information formats and RNTIs.

For example, the second communication apparatus indicates the SRS switching power of the transmit carrier by using the control information. In this case, assuming that the first communication standard corresponds to the second control information, and the second communication standard corresponds to the third control information, an RNTI corresponding to the second control information may be a TPC-SRS-RNTI 1, and an RNTI corresponding to the third control information may be a TPC-SRS-RNTI 2.

For example, the second communication apparatus indicates the PUSCH power of the transmit carrier by using the control information. In this case, assuming that the first communication standard corresponds to the second control information, and the second communication standard corresponds to the third control information, an RNTI corresponding to the second control information may be a TPC-PUSCH-RNTI 1, and an RNTI corresponding to the third control information may be a TPC-PUSCH-RNTI 2.

For example, the second communication apparatus indicates the PUCCH power of the transmit carrier by using the control information. In this case, assuming that the first communication standard corresponds to the second control information, and the second communication standard corresponds to the third control information, an RNTI corresponding to the second control information may be a TPC-PUCCH-RNTI 1, and an RNTI corresponding to the third control information may be a TPC-PUCCH-RNTI 2.

For another example, the second communication apparatus indicates the SRS switching power of the transmit carrier by using the control information. In this case, assuming that the first communication standard corresponds to the second control information, and the second communication standard corresponds to the third control information, a control information format of the second control information may be a DCI format s-1, and a control information format of the third control information may be a DCI format s-2.

For another example, the second communication apparatus indicates the PUSCH power of the transmit carrier by using the control information. In this case, assuming that the first communication standard corresponds to the second control information, and the second communication standard corresponds to the third control information, a control information format of the second control information may be a DCI format s-1, and a control information format of the third control information may be a DCI format s-2.

For another example, the second communication apparatus indicates the PUCCH power of the transmit carrier by using the control information. In this case, assuming that the first communication standard corresponds to the second control information, and the second communication standard corresponds to the third control information, a control information format of the second control information may be a DCI format s-1, and a control information format of the third control information may be a DCI format s-2.

Specifically, that the second communication apparatus indicates SRS transmit carrier switching by using the second configuration information is used as an example, and a specific information element format may be shown as follows.

"SRS-Carrier Switching" indicates SRS carrier switching configuration information, "srs-Switch From RAT-Cell group" indicates a transmit standard carrier group from which the switching is performed, and "srs-SwitchFrom-ServCellIndex" indicates a carrier, in the transmit standard carrier group, from which the switching is performed.

```
SRS-CarrierSwitching ::=        SEQUENCE {
    srs-SwitchFromRAT-Cellgroup        INTEGER (0..1or 2)
    OPTIONAL, -- Need M
    srs-SwitchFromServCellIndex        INTEGER (0..31)
    OPTIONAL, -- Need M
    ...
}
```

Specifically, that the second communication apparatus indicates the SRS switching power of the transmit carrier by using the control information is used as an example, and a specific information element format may be shown as follows.

The second communication apparatus may indicate two or more SRS TPC scrambling RNTIs to the first communication apparatus, and different RNTIs correspond to different communication standards. For example, the second communication apparatus configures RAT-Cellgroup-RNTI1 and RAT-Cellgroup-RNTI1 for the first communication apparatus, where "RAT-Cellgroup-RNTI1" represents an SRS TPC scrambling RNTI corresponding to the first communication standard, and "RAT-Cellgroup-RNTI2" represents an SRS TPC scrambling RNTI corresponding to the second communication standard.

In addition, the second communication apparatus may indicate RAT-Cellgroup in configuration signaling of SRS-TPC-PDCCH-Config, in other words, indicate a transmit The third configuration information may indicate transmission control channel carriers corresponding to at least two communication standards supported by the first communication apparatus.

Different communication standards may correspond to different transmission control channel carriers. The transmission control channel carrier may be used to transmit transmission control information. The transmission control channel carrier may also be described as a transmission control channel cell group.

For example, the first communication apparatus supports a first communication standard and a second communication standard. In this case, for a master cell group or a master transmit carrier group MCG of the first communication apparatus, the second communication apparatus may configure two transmission control channel carriers for the MCG. To be specific, the third configuration information

```
SRS-CarrierSwitching ::=               SEQUENCE {
    srs-SwitchFromRAT-Cellgroup             INTEGER (0..1or 2)
OPTIONAL, -- Need M
    srs-SwitchFromServCellIndex             INTEGER (0..31)
OPTIONAL, -- Need M
        srs-SwitchFromCarrier               ENUMERATED {sUL, nUL},
        Multi-RAT-srs-TPC-PDCCH-Group           SEQUENCE { //scheme 2
            RAT-Cellgroup-RNTI1             RNTI-Value,
            RAT-Cellgroup-RNTI2             RNTI-Value,
        }
    srs-TPC-PDCCH-Group1 or 2//scheme 2CHOICE {
    typeA   SEQUENCE (SIZE (1..32)) OF SRS-TPC-PDCCH-Config,
    typeB   SRS-TPC-PDCCH-Config
        }
OPTIONAL, -- Need M
    }
SRS-TPC-PDCCH-Config ::=                SEQUENCE {
    RAT-Cellgroup                       INTEGER (0..1or 2)//scheme 1
OPTIONAL, -- Need M
srs-CC-SetIndexlist                     SEQUENCE (SIZE(1..4)) OF SRS-CC-SetIndex
OPTIONAL  -- Need M
}
SRS-CC-SetIndex ::=                     SEQUENCE {
    cc-SetIndex                     INTEGER (0..3)
OPTIONAL -- Need M
    cc-IndexInOneCC-Set                 INTEGER (0..7)
OPTIONAL  -- Need M
}
```

Figure 14:
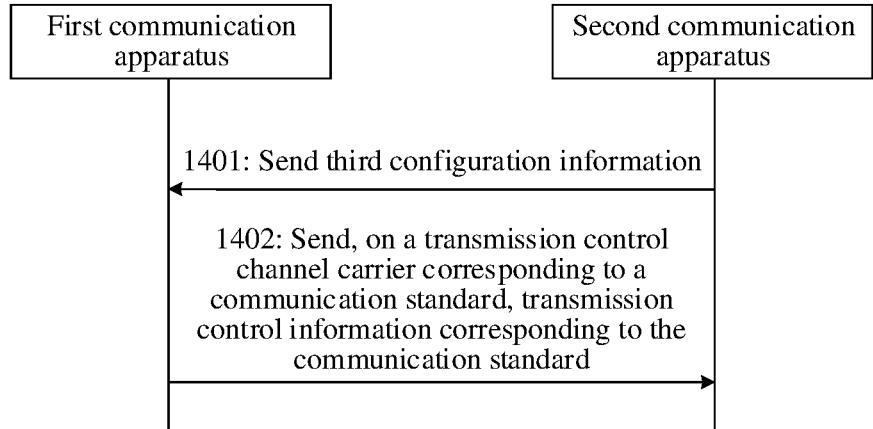
FIG. 14 is a flowchart of a communication method according to an embodiment of this application.
Figure 16:
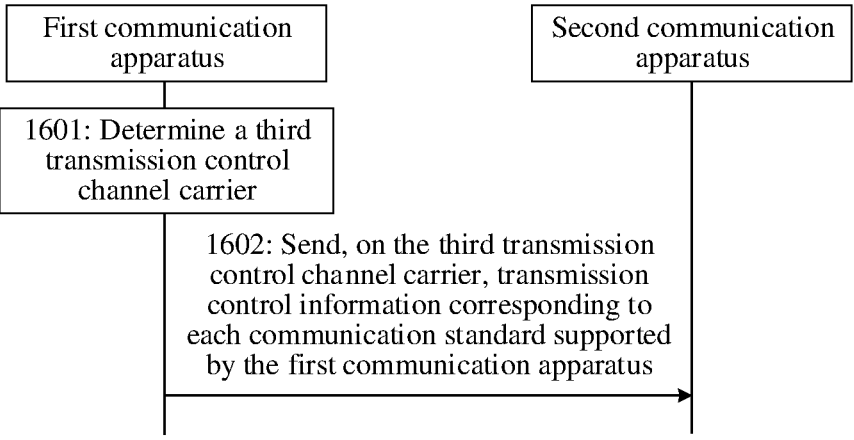
FIG. 16 is a flowchart of a communication method according to an embodiment of this application.

Based on the methods shown in FIG. 8 to FIG. 13, as shown in FIG. 14, when the first communication apparatus supports the joint UCI feedback in the inter-RAT CA, the first communication apparatus and the second communication apparatus may further communicate according to a method shown in FIG. 14 or FIG. 16. These embodiments of this application may be used in combination with the foregoing embodiments, or may be independent of the foregoing embodiments. This is not limited.

FIG. 14 shows a communication method according to an embodiment of this application. A first communication apparatus may perform joint UCI feedback in a same transmit standard carrier group according to the method shown in FIG. 14. This embodiment of this application may be used in combination with the foregoing embodiments, or may be independent of the foregoing embodiments. This is not limited. As shown in FIG. 14, the method may include the following steps.

Step 1401: A second communication apparatus sends third configuration information. Correspondingly, the first communication apparatus obtains the third configuration information.

may indicate a first transmission control channel carrier and a second transmission control channel carrier. The first transmission control channel carrier may correspond to the first communication standard, and the second transmission control channel carrier may correspond to the second communication standard.

For example, the transmission control channel carrier may be a PUCCH carrier, and the transmission control information may be UCI information. The UCI information may include one or more of the following: a scheduling request (SR), HARQ-ACK information, and CSI.

For example, control information may be DCI, or may be control information in a future communication system, for example, reception control information (RxCI). This is not limited.

For example, the UCI may also be uplink control information in the future communication system, for example, transmission control information (TxCI). This is not limited.

For example, a physical downlink control channel PDCCH may also be a reception control channel in the future communication system, for example, a physical reception control channel (PRxCCH). This is not limited.

For example, a physical uplink control channel PUCCH may also be a transmission control channel in the future communication system, for example, a physical transmission control channel (PTxCCH). This is not limited.

For example, a physical downlink shared channel PDSCH may also be a reception data channel in the future communication system, for example, a physical reception shared channel (PRxSCH). This is not limited.

For example, a physical uplink shared channel PUSCH may also be a transmission data channel in the future communication system, for example, a physical transmission shared channel (PTxSCH). This is not limited.

Step 1402: The first communication apparatus sends, on a transmission control channel carrier corresponding to a communication standard, transmission control information corresponding to the communication standard.

For example, the third configuration information indicates a first transmission control channel carrier and a second transmission control channel carrier, the first transmission control channel carrier corresponds to a first communication standard, and the second transmission control channel carrier corresponds to a second communication standard. In this case, the first communication apparatus may send, on the first transmission control channel carrier, transmission control information corresponding to the first communication standard, and send, on the second transmission control channel carrier, transmission control information corresponding to the second communication standard.

Figure 15:
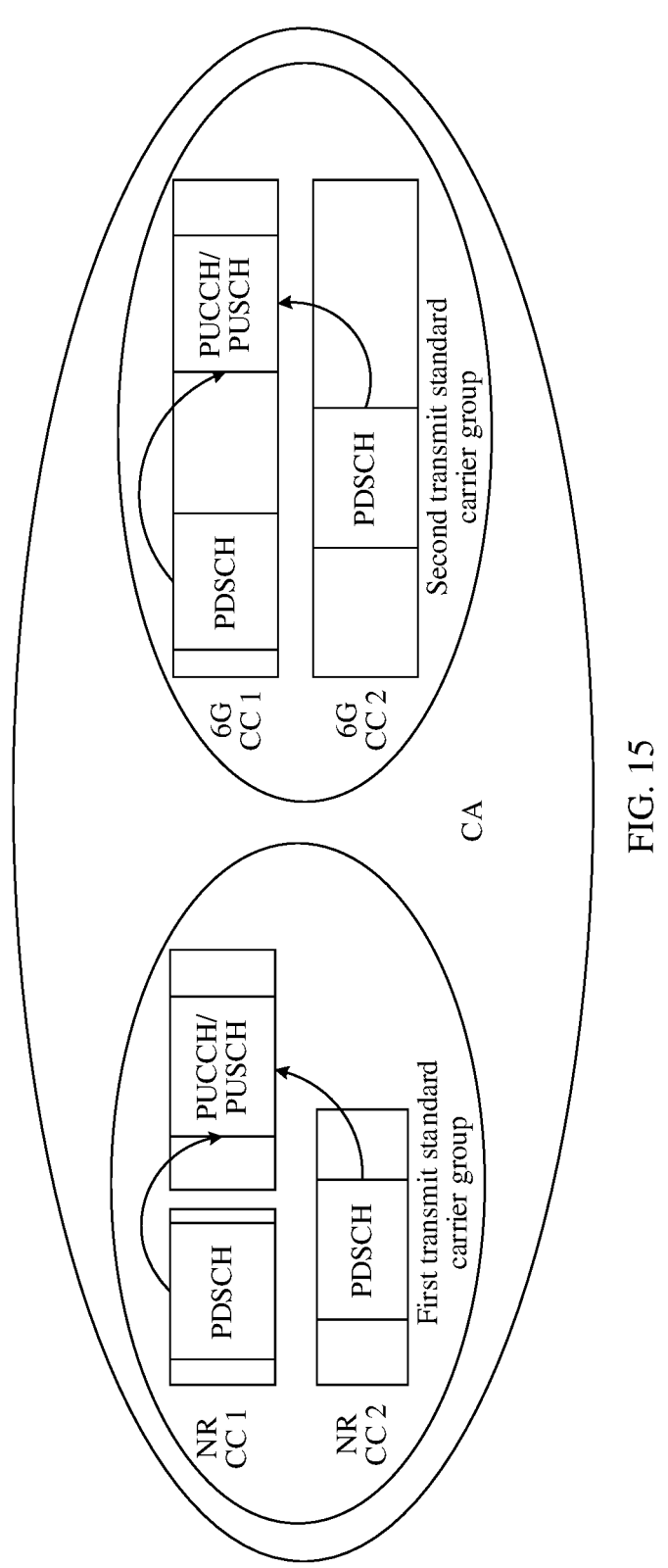
FIG. 15 is a schematic diagram of joint UCI feedback in a same transmit standard carrier group according to an embodiment of this application.

For example, as shown in FIG. 15, the first communication apparatus supports NR and 6G. In this case, a transmission control channel carrier that corresponds to NR and that is configured by the second communication apparatus for the first communication apparatus may be an NR CC 1, and a transmission control channel carrier that corresponds to 6G and that is configured for the first communication apparatus may be a 6G CC 1. The first communication apparatus may include HARQ-ACK information of downlink data (for example, a PDSCH) corresponding to NR in the NR CC 1 for transmission, and include HARQ-ACK information of downlink data (for example, a PDSCH) corresponding to 6G in the 6G CC 1 for transmission.

It should be noted that, for an NR communication system, a transmit carrier and a receive carrier may be a same carrier. To be specific, a transmission control channel carrier configured by the second communication apparatus for the first communication apparatus may be described as an NR CC 1, or may be described as a PUCCH carrier. For a 6G communication system or a future communication system, a transmit carrier and a receive carrier may not be a same carrier. To be specific, a transmission control channel carrier configured by the second communication apparatus for the first communication apparatus may be described as a PUCCH carrier. For a TDD communication system, a transmit carrier and a receive carrier may be a same carrier. To be specific, a transmission control channel carrier configured by the second communication apparatus for the first communication apparatus may be described as a CC 1, or may be described as a PUCCH carrier. For an FDD communication system, a transmit carrier and a receive carrier may not be a same carrier. To be specific, a transmission control channel carrier configured by the second communication apparatus for the first communication apparatus may be described as a PUCCH carrier.

In addition, as shown in FIG. 15, transmission control information may be transmitted by using a PUCCH carrier, or may be carried in a PUSCH carrier for transmission.

FIG. 16 shows a communication method according to an embodiment of this application. A first communication apparatus may perform joint UCI feedback between different transmit standard carrier groups according to the method shown in FIG. 16. This embodiment of this application may be used in combination with the foregoing embodiments, or may be independent of the foregoing embodiments. This is not limited. As shown in FIG. 16, the method may include the following steps.

Step 1601: The first communication apparatus determines a third transmission control channel carder.

The third transmission control channel carrier may correspond to any communication standard supported by the first communication apparatus.

For example, the first communication apparatus supports a first communication standard and a second communication standard. In this case, the third transmission control channel carrier may correspond to the first communication standard or the second communication standard.

In a possible design, the first communication apparatus obtains third configuration information, where the third configuration information indicates the third transmission control channel carrier.

In another possible design, the first communication apparatus obtains third configuration information, where the third configuration information indicates at least two transmission control channel carriers. For example, the at least two transmission control channel carriers include the third transmission control channel carrier and a fourth control channel carrier. The first communication apparatus obtains second scheduling information, where the second scheduling information indicates the third transmission control channel carrier. The first communication apparatus determines the third transmission control channel carrier based on the second scheduling information.

For example, the first communication apparatus supports a first communication standard and a second communication standard. In this case, the second communication apparatus may configure, for the first communication apparatus, a third transmission control channel carrier corresponding to the first communication standard and a fourth transmission control channel carrier corresponding to the second communication standard. The second communication apparatus may further send, to the first communication apparatus, second scheduling information indicating the third transmission control information carrier, so that the first communication apparatus feeds back transmission control information based on the third transmission control information carrier. Alternatively, the second communication apparatus may further send, to the first communication apparatus, second scheduling information indicating the fourth transmission control information carrier, so that the first communication apparatus feeds back transmission control information based on the fourth transmission control information carrier.

Based on the foregoing two possible designs, the second communication apparatus may directly configure a transmission control information carrier for the first communication apparatus, or may send second scheduling information to the first communication apparatus to indicate a transmission control information carrier, to implement dynamic selection of a transmission control information carrier, increase available candidate PUCCH feedback resources, reduce costs, and reduce a delay.

Step 1602: The first communication apparatus sends, on the third transmission control channel carrier, transmission control information corresponding to each communication standard supported by the first communication apparatus.

For example, the first communication apparatus supports a first communication standard and a second communication standard. In this case, the first communication apparatus may send, on the third transmission control channel carrier, transmission control information corresponding to the first communication standard and transmission control information corresponding to the second communication standard.

In a possible design, the first communication apparatus performs, based on a communication standard corresponding to the third transmission control channel carrier, joint encoding on transmission control information corresponding to communication standards supported by the first communication apparatus, and sends an encoded result to the second communication apparatus by using a resource of the third transmission control channel carrier.

When the first communication apparatus performs joint encoding on the transmission control information corresponding to the communication standards, an encoding sequence of the transmission control information corresponding to the communication standards may be pre-specified in a communication protocol, or may be indicated by the second communication apparatus to the first communication apparatus.

For example, determining the encoding sequence may be sequentially determining an encoding sequence of transmission control information corresponding to transmit carriers of transmit standard carrier groups in ascending order of identification information of the transmit standard carrier groups corresponding to the transmit carriers and identification information of the transmit carriers, for example, first arranging the transmit standard carrier groups in ascending order of the identification information of the transmit standard carrier groups, and for a plurality of carriers in a same transmit standard carrier group, arranging the carriers in ascending order of the identification information of the transmit carriers.

For another example, determining the encoding sequence may alternatively be sequentially determining an encoding sequence of transmission control information corresponding to transmit carriers in ascending order of identification information of the transmit carriers.

For example, the first communication apparatus supports a first communication standard and a second communication standard. In this case, the first communication apparatus may encode, based on the communication standard corresponding to the third transmission control channel carrier, transmission control information corresponding to the first communication standard and transmission control information corresponding to the second communication standard, to obtain first transmission control information. The first communication apparatus may send the first transmission control information by using a first resource of the third transmission control channel carrier.

In another possible design, the first communication apparatus separately performs, based on a communication standard corresponding to the third transmission control channel carrier, independent encoding on transmission control information corresponding to communication standards supported by the first communication apparatus, and sends encoded results to the second communication apparatus by using one or more resources of the third transmission control channel carrier.

Encoded results corresponding to different communication standards may be transmitted on different resources of the third transmission control channel carrier, or may be transmitted on one resource of the third transmission control channel carrier.

A resource location (or may be described as a symbol location) occupied by an encoded result corresponding to each communication standard on the third transmission control channel carrier may be pre-specified in a communication protocol, or may be indicated by the second communication apparatus to the first communication apparatus. This is not limited.

Optionally, the second communication apparatus indicates, in resource configuration information of the third transmission control channel carrier, the resource location occupied by the encoded result corresponding to each communication standard.

For example, the first communication apparatus supports a first communication standard and a second communication standard. In this case, the first communication apparatus may encode, based on the communication standard corresponding to the third transmission control channel carrier, transmission control information corresponding to the first communication standard, to obtain second transmission control information; and encode, based on the communication standard corresponding to the third transmission control channel carrier, transmission control information corresponding to the second communication standard, to obtain third transmission control information. The first communication apparatus may send the second transmission control information by using a second resource of the third transmission control channel carrier, and send the third transmission control information by using a third resource of the third transmission control channel carrier.

Optionally, the second resource and the third resource may be predefined in a protocol. For example, there is a correspondence between the second resource and the third resource.

Optionally, the second resource and the third resource may be notified by the second communication apparatus to the first communication apparatus by using signaling. This is not limited in this application.

For example, the first communication apparatus supports NR and 6G, an encoded result corresponding to NR occupies a symbol a of a PUCCH carrier, an encoded result corresponding to 6G occupies a symbol b of the PUCCH carrier, and a communication standard corresponding to the PUCCH carrier is NR. In this case, the first communication apparatus may encode UCI information corresponding to NR in an NR encoding manner, to obtain UCI information 1; encode UCI information corresponding to 6G in the NR encoding manner, to obtain UCI information 2; and send the UCI information 1 and the UCI information 2 to the second communication apparatus by including the UCI information 1 in the symbol a of the PUCCH carrier and including the UCI information 2 in the symbol b of the PUCCH carrier.

For another example, the first communication apparatus supports NR and 6G, an encoded result corresponding to NR occupies the first two symbols of a PUCCH carrier, an encoded result corresponding to 6G occupies the last two symbols of the PUCCH carrier, and a communication standard corresponding to the PUCCH carrier is 6G. In this case, the first communication apparatus may encode UCI information corresponding to NR in a 6G encoding manner, to obtain UCI information 3; encode UCI information corresponding to 6G in the 6G encoding manner, to obtain UCI information 4; and send the UCI information 3 and the UCI information 4 to the second communication apparatus by including the UCI information 3 in the first two symbols of the PUCCH carrier and including the UCI information 4 in the last two symbols of the PUCCH carrier.

In still another possible design, the first communication apparatus separately performs, based on communication standards corresponding to PDSCH carriers, independent encoding on transmission control information of PDSCH carriers corresponding to communication standards supported by the first communication apparatus, and sends encoded results to the second communication apparatus by using one or more resources of the third transmission control channel carrier.

For example, the first communication apparatus supports a first communication standard and a second communication standard. In this case, the first communication apparatus may encode, based on the first communication standard, transmission control information of a PDSCH carrier corresponding to the first communication standard, to obtain fourth transmission control information; and encode, based on the second communication standard, transmission control information of a PDSCH carrier corresponding to the second communication standard, to obtain fifth transmission control information. The first communication apparatus may send the fourth transmission control information by using a fourth resource of the third transmission control channel carrier, and send the fifth transmission control information by using a fifth resource of the third transmission control channel carrier.

Optionally, the fourth resource and the fifth resource may be predefined in a protocol. For example, there is a correspondence between the fourth resource and the fifth resource.

Optionally, the fourth resource and the fifth resource may be notified by the second communication apparatus to the first communication apparatus by using signaling. This is not limited in this application.

For example, the first communication apparatus supports NR and 6G, an encoded result corresponding to NR occupies a symbol c of a PUCCH carrier, an encoded result corresponding to 6G occupies a symbol d of the PUCCH carrier, and a communication standard corresponding to the PUCCH carrier is NR. In this case, the first communication apparatus may encode UCI information of a PDSCH carrier corresponding to NR in an NR encoding manner, to obtain UCI information 5; encode UCI information of a PDSCH carrier corresponding to 6G in a 6G encoding manner, to obtain UCI information 6; and send the UCI information 5 and the UCI information 6 to the second communication apparatus by including the UCI information 5 in the symbol c of the PUCCH carrier and including the UCI information 6 in the symbol d of the PUCCH carrier.

For another example, the first communication apparatus supports NR and 6G, an encoded result corresponding to NR occupies the first two symbols of a PUCCH carrier, an encoded result corresponding to 6G occupies the last two symbols of the PUCCH carrier, and a communication standard corresponding to the PUCCH carrier is 6G. In this case, the first communication apparatus may encode UCI information of a PDSCH carrier corresponding to NR in an NR encoding manner, to obtain UCI information 7; encode UCI information of a PDSCH carrier corresponding to 6G in a 6G encoding manner, to obtain UCI information 8; and send the UCI information 7 and the UCI information 8 to the second communication apparatus by including the UCI information 7 in the first two symbols of the PUCCH carrier and including the UCI information 8 in the last two symbols of the PUCCH carrier.

Figure 17:
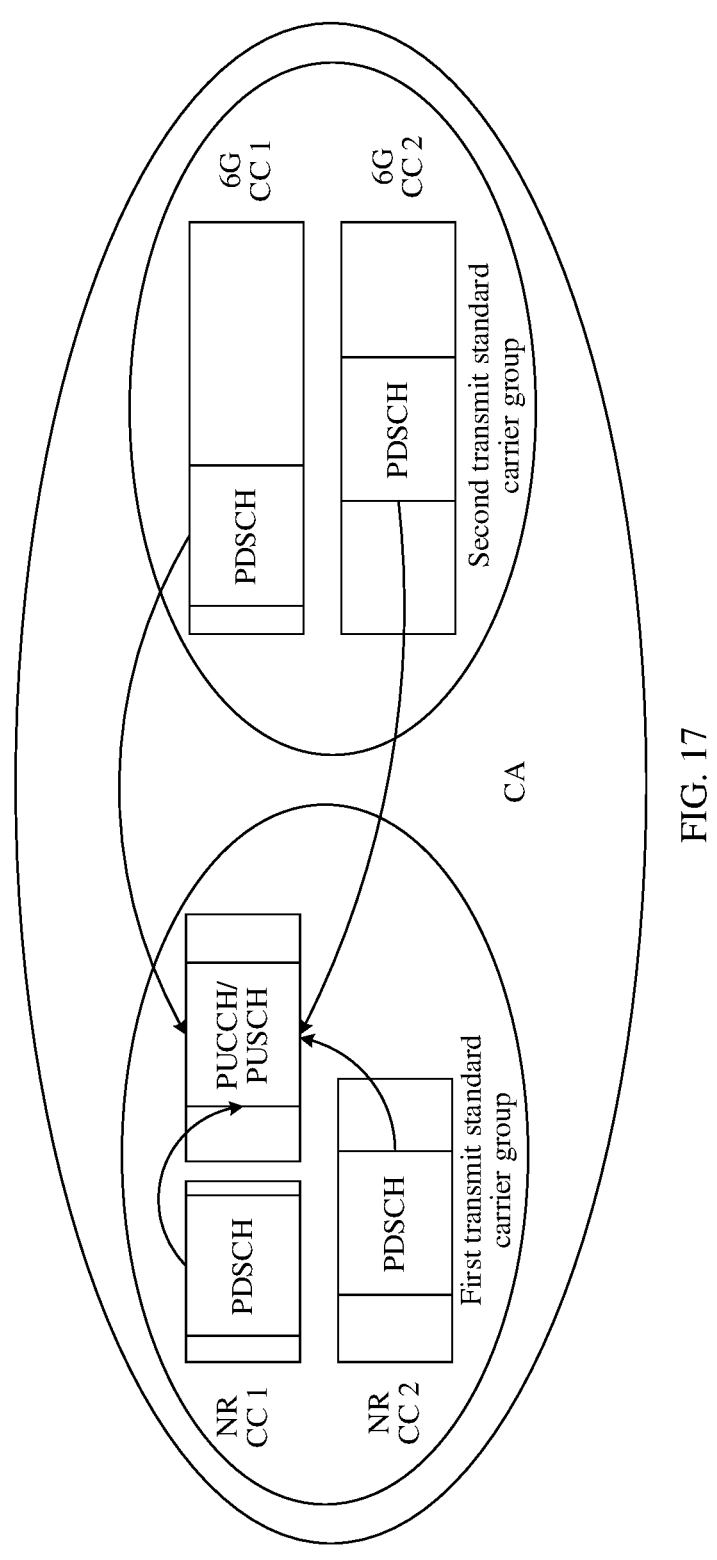
FIG. 17 is a schematic diagram of joint UCI feedback between different transmit standard carrier groups according to an embodiment of this application.

Based on the foregoing three possible designs, as shown in FIG. 17, that the first communication apparatus supports NR and 6G is used as an example. The third transmission control channel carrier configured by the second communication apparatus for the first communication apparatus may be a PUCCH carrier. The first communication apparatus may include HARQ-ACK information of downlink data (for example, a PDSCH) corresponding to NR in the PUCCH carrier for transmission, and may also include HARQ-ACK information of downlink data (for example, a PDSCH) corresponding to 6G in the PUCCH carrier for transmission.

In addition, as shown in FIG. 17, transmission control information may be transmitted by using a PUCCH carrier, or may be carried in a PUSCH carrier for transmission.

Based on the methods shown in FIG. 14 to FIG. 17, the second communication apparatus may further send indication information to the first communication apparatus, to indicate the first communication apparatus to perform joint UCI feedback in a same transmit standard carrier group, or perform joint UCI feedback between different transmit standard carrier groups. The second communication apparatus may send the indication information to the first communication apparatus by including the indication information in control information.

Based on the methods shown in FIG. 8 to FIG. 17, when the first communication apparatus supports the symbol-level dynamic power sharing in the inter-RAT CA, if a symbol of a channel corresponding to one communication standard in at least two communication standards supported by the first communication apparatus overlaps a symbol of a channel corresponding to another communication standard, the first communication apparatus may determine, based on a transmit power of the symbol of the channel corresponding to the communication standard, a transmit power of the symbol of the channel corresponding to the another communication standard. Therefore, the second communication apparatus does not configure, for the first communication apparatus, the transmit power of the symbol of the channel corresponding to the another communication standard, and signaling overheads are reduced. This embodiment of this application may be used in combination with the foregoing embodiments, or may be independent of the foregoing embodiments. This is not limited.

The channel may alternatively be replaced with a signal. The channel may include one or more of the following channels: a PRACH, a PUCCH, and a PUSCH. The signal may be an SRS.

For example, the first communication apparatus supports a first communication standard and a second communication standard. In this case, when a symbol of a channel corresponding to the first communication standard overlaps a symbol of a channel corresponding to the second communication standard, the first communication apparatus may determine, based on a transmit power of the symbol of the channel corresponding to the first communication standard, a transmit power of the symbol of the channel corresponding to the second communication standard.

In a possible design, the first communication apparatus determines transmit powers of a plurality of channels on an overlapping symbol based on channel and/or signal priorities.

The channel and/or signal priority may be pre-specified in a communication protocol, or may be indicated by the second communication apparatus.

In a possible design, the first communication apparatus determines transmit powers of a plurality of channels on an overlapping symbol based on priorities of transmit carriers.

Optionally, the first communication apparatus and/or the second communication apparatus determine/determines the priorities of the transmit carriers based on identification information of transmit standard carrier groups and identification information of the transmit carriers.

For example, smaller identification information of a transmit standard carrier group indicates a higher priority. In a case of same identification information of a transmit standard carrier group, smaller identification information of a transmit carrier indicates a higher priority.

Optionally, the first communication apparatus and/or the second communication apparatus determine/determines the priorities of the transmit carriers based on communication standards of the transmit carriers.

In a possible design, the first communication apparatus determines transmit powers of a plurality of channels on an overlapping symbol based on priorities of transmit carriers and channel and/or signal priorities.

For example, a priority of an NR carrier may be higher than a priority of a 6G carrier.

For example, the channel and/or signal priorities may be: PRACH>PUCCH>PUSCH with UCI>PUSCH>SRS.

For example, the priorities of the transmit carriers and the channel and/or signal priorities are used as an example. Based on a total transmit power, the first communication apparatus may preferentially allocate transmit powers of channels of NR carriers, for example, first allocates a transmit power of a PRACH, and then sequentially allocates a transmit power of a PUCCH, a transmit power of a PUSCH with UCI, a transmit power of a PUSCH, and a transmit power of an SRS. Then, the first communication apparatus allocates transmit powers of channels of 6G carriers, for example, first allocates a transmit power of a PRACH, and then sequentially allocates a transmit power of a PUCCH, a transmit power of a PUSCH with UCI, a transmit power of a PUSCH, and a transmit power of an SRS.

Further, when the transmit power is limited, power scaling may also be performed based on the priorities of the transmit carriers and the channel and/or signal priorities.

A power scaling priority may be determined based on identification information of a transmit standard carrier group and identification information of a transmit carrier.

It should be noted that scaling ratios limited by different communication standards may be different. When a scaling ratio corresponding to a communication standard is greater than a scaling ratio limited by the communication standard, transmission in the communication standard may be stopped, to avoid transmission of a signal with poor signal quality, and therefore ensure communication quality.

Optionally, the first communication apparatus determines a power scaling ratio based on a communication standard. For example, a scaling ratio corresponding to a first communication standard is s1, and a scaling ratio corresponding to a second communication standard is s2.

For example, a scaling ratio limited by the first communication standard is 0 dB. In this case, when the scaling ratio corresponding to the first communication standard is greater than or equal to 0 dB, transmission in the first communication standard is stopped.

For another example, a scaling ratio limited by the second communication standard is 3 dB. In this case, when the scaling ratio corresponding to the second communication standard is greater than or equal to 3 dB, transmission in the second communication standard is stopped.

In another possible design, the first communication apparatus allocates transmit powers of a plurality of channels on an overlapping symbol at an equal proportion.

When a transmit power is limited, power scaling may be performed at an equal proportion.

Similar to the foregoing descriptions of the TPC command in the SRS switching, for the inter-RAT CA, an embodiment of this application also provides a manner of indicating a transmit power control command. This embodiment of this application may be used in combination with the foregoing embodiments, or may be independent of the foregoing embodiments. This is not limited.

In this embodiment of this application, a second communication apparatus may indicate, to a first communication apparatus by using control information, a transmit power control command corresponding to each of at least two transmit carriers. The first communication apparatus may determine, based on the control information, the transmit power control command corresponding to each of the at least two transmit carriers.

The TPC command of the transmit carrier may correspond to a bit block in the control information. The control information may be DCI, or may be control information in a future communication system, for example, reception control information (reception control information, RxCI). This is not limited.

The transmit power control command may be one or more of the following: an SRS transmit power control command, a PUSCH transmit power control command, and a PUCCH transmit power control command.

For one transmit carrier, control information may include one or more of the foregoing transmit power control commands.

In a possible design, the second communication apparatus sends, to the first communication apparatus by using one piece of control information, TPC commands of transmit carriers corresponding to different communication standards.

For example, the second communication apparatus may send first control information to the first communication apparatus, where the first control information may indicate TPC commands of the at least two transmit carriers.

In another possible design, the second communication apparatus sends, to the first communication apparatus by using different control information, TPC commands of transmit carriers corresponding to different communication standards.

For example, the first communication apparatus supports a first communication standard and a second communication standard. In this case, the second communication apparatus may send second control information and third control information to the first communication apparatus, where the second control information indicates a transmit power control TPC command of a transmit carrier corresponding to the first communication standard, and the third control information indicates a TPC command of a transmit carrier corresponding to the second communication standard. Optionally, the first communication apparatus and/or the second communication apparatus may determine, based on identification information of a transmit standard carrier group corresponding to each of the at least two transmit carriers and identification information of each transmit carrier, a location of the TPC command of each transmit carrier in the control information corresponding to the transmit carrier. For details, refer to related descriptions of the SRS switching power. Details are not described herein again.

Optionally, the first communication apparatus and/or the second communication apparatus may determine, based on identification information of each of the at least two transmit carriers, a location of the TPC command of each transmit carrier in the control information corresponding to the transmit carrier. For details, refer to related descriptions of the SRS switching power. Details are not described herein again.

Optionally, the second communication apparatus may send fourth configuration information to the first communication apparatus. The fourth configuration information may indicate the location of the TPC command of each transmit carrier in the control information corresponding to the transmit carrier. The first communication apparatus may determine, based on the fourth configuration information, the location of the TPC command of each transmit carrier in the control information corresponding to the transmit carrier. For details, refer to related descriptions of the SRS switching power. Details are not described herein again.

The foregoing mainly describes the solutions provided in embodiments of this application from a perspective of interaction between devices. It may be understood that to implement the foregoing functions, the devices include hardware structures and/or software modules corresponding to the functions. A person skilled in the art should easily be aware that, in combination with algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, each device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division during actual implementation.

Figure 18:
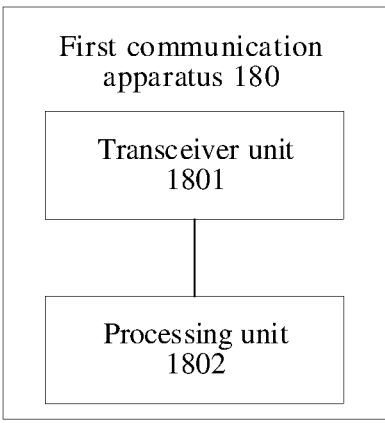
FIG. 18 is a schematic composition diagram of a first communication apparatus according to an embodiment of this application.

When each functional module is obtained through division based on each corresponding function, FIG. 18 shows a first communication apparatus. The first communication apparatus 180 may include a transceiver unit 1801 and a processing unit 1802. For example, the first communication apparatus 180 may be the first communication apparatus, or may be a chip used in the first communication apparatus, or another combined component, part, or the like that has a function of the first communication apparatus. When the first communication apparatus 180 is the first communication apparatus, the transceiver unit 1801 may be a transceiver, and the transceiver may include an antenna, a radio frequency circuit, and the like. The processing unit 1802 may be a processor (or a processing circuit), for example, a baseband processor, and the baseband processor may include one or more CPUs. When the first communication apparatus 180 is a component having a function of the first communication apparatus, the transceiver unit 1801 may be a radio frequency unit, and the processing unit 1802 may be a processor (or a processing circuit), for example, a baseband processor. When the first communication apparatus 180 is a chip system, the transceiver unit 1801 may be an input/output interface of a chip (for example, a baseband chip), and the processing unit 1802 may be a processor (or a processing circuit) or a logic circuit of the chip system, where the processing unit may include one or more central processing units. It should be understood that in this embodiment of this application, the transceiver unit 1801 may be implemented by a transceiver or a transceiver-related circuit component, and the processing unit 1802 may be implemented by a processor or a processor-related circuit component (or referred to as a processing circuit).

For example, the transceiver unit 1801 may be configured to perform all receiving and sending operations performed by the first communication apparatus in the embodiments shown in FIG. 8 to FIG. 17, and/or configured to support another process of the technology described in this specification. The processing unit 1802 may be configured to perform all operations, other than the receiving and sending operations, performed by the first communication apparatus in the embodiments shown in FIG. 8 to FIG. 17, and/or configured to support another process of the technology described in this specification.

The transceiver unit 1801 is configured to obtain first configuration information, where the first configuration information indicates the first communication apparatus to perform carrier aggregation communication on at least two transmit carriers, the at least two transmit carriers include a first transmit carrier and a second transmit carrier, the first transmit carrier corresponds to a first communication standard, the second transmit carrier corresponds to a second communication standard, and the first communication standard is different from the second communication standard.

The processing unit 1802 is configured to perform carrier aggregation communication on the at least two transmit carriers based on the first configuration information.

In another possible implementation, the transceiver unit 1801 in FIG. 18 may be replaced with a transceiver, and a function of the transceiver unit 1801 may be integrated into the transceiver. The processing unit 1802 may be replaced with a processor, and a function of the processing unit 1802 may be integrated into the processor. Further, the first communication apparatus 180 shown in FIG. 18 may further include a memory. When the transceiver unit 1801 is replaced with a transceiver, and the processing unit 1802 is replaced with a processor, the first communication apparatus 180 in this embodiment of this application may be the communication apparatus shown in FIG. 7.

Figure 20:
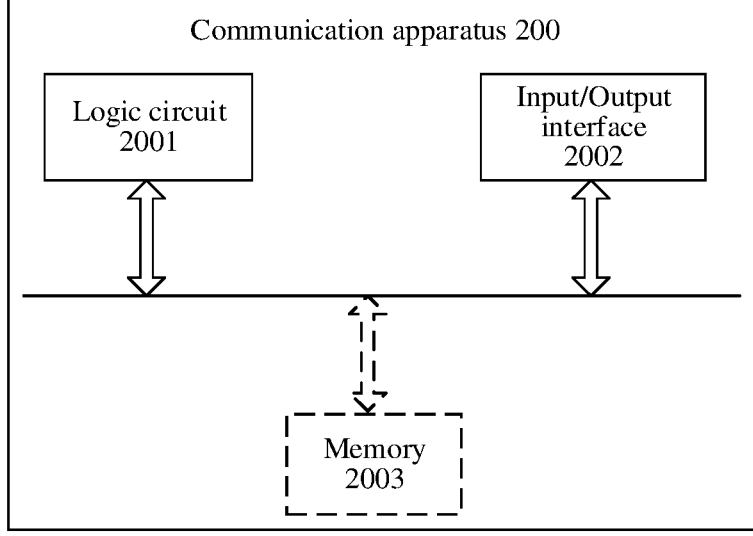
FIG. 20 is a schematic composition diagram of a communication apparatus according to an embodiment of this application.

Alternatively, when the transceiver unit 1801 is replaced with a transceiver, and the processing unit 1802 is replaced with a processor, the first communication apparatus 180 in this embodiment of this application may be a communication apparatus 200 shown in FIG. 20. The processor may be a logic circuit 2001, and the transceiver may be an input/output interface 2002. Further, the communication apparatus 200 shown in FIG. 20 may include a memory 2003.

Figure 19:
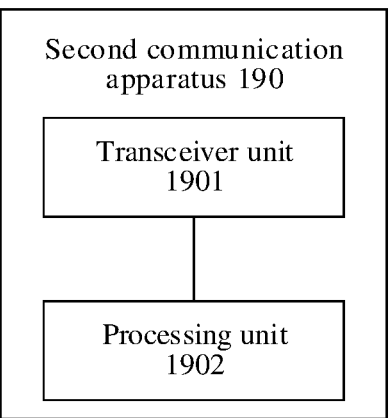
FIG. 19 is a schematic composition diagram of a second communication apparatus according to an embodiment of this application.

When each functional module is obtained through division based on each corresponding function, FIG. 19 shows a second communication apparatus. The second communication apparatus 190 may include a transceiver unit 1901 and a processing unit 1902. For example, the second communication apparatus 190 may be the second communication apparatus, or may be a chip used in the second communication apparatus, or another combined component, part, or the like that has a function of the second communication apparatus. When the second communication apparatus 190 is the second communication apparatus, the transceiver unit 1901 may be a transceiver, and the transceiver may include an antenna, a radio frequency circuit, and the like. The processing unit 1902 may be a processor (or a processing circuit), for example, a baseband processor, and the baseband processor may include one or more CPUs. When the second communication apparatus 190 is a component having a function of the second communication apparatus, the transceiver unit 1901 may be a radio frequency unit, and the processing unit 1902 may be a processor (or a processing circuit), for example, a baseband processor. When the second communication apparatus 190 is a chip system, the transceiver unit 1901 may be an input/output interface of a chip (for example, a baseband chip), and the processing unit 1902 may be a processor (or a processing circuit) or a logic circuit of the chip system, where the processing unit may include one or more central processing units. It should be understood that in this embodiment of this application, the transceiver unit 1901 may be implemented by a transceiver or a transceiver-related circuit component, and the processing unit 1902 may be implemented by a processor or a processor-related circuit component (or referred to as a processing circuit).

For example, the transceiver unit 1901 may be configured to perform all receiving and sending operations performed by the second communication apparatus in the embodiments shown in FIG. 8 to FIG. 17, and/or configured to support another process of the technology described in this specification. The processing unit 1902 may be configured to perform all operations, other than the receiving and sending operations, performed by the second communication apparatus in the embodiments shown in FIG. 8 to FIG. 17, and/or configured to support another process of the technology described in this specification.

The transceiver unit 1901 is configured to send first configuration information, where the first configuration information indicates a first communication apparatus to perform carrier aggregation communication on at least two transmit carriers, the at least two transmit carriers include a first transmit carrier and a second transmit carrier, the first transmit carrier corresponds to a first communication standard, the second transmit carrier corresponds to a second communication standard, and the first communication standard is different from the second communication standard.

The processing unit 1902 is configured to perform carrier aggregation communication on the at least two transmit carriers based on the first configuration information.

In another possible implementation, the transceiver unit 1901 in FIG. 19 may be replaced with a transceiver, and a function of the transceiver unit 1901 may be integrated into the transceiver. The processing unit 1902 may be replaced with a processor, and a function of the processing unit 1902 may be integrated into the processor. Further, the second communication apparatus 190 shown in FIG. 19 may further include a memory. When the transceiver unit 1901 is replaced with a transceiver, and the processing unit 1902 is replaced with a processor, the second communication apparatus 190 in this embodiment of this application may be the communication apparatus shown in FIG. 7.

Alternatively, when the transceiver unit 1901 is replaced with a transceiver, and the processing unit 1902 is replaced with a processor, the second communication apparatus 190 in this embodiment of this application may be a communication apparatus 200 shown in FIG. 20. The processor may be a logic circuit 2001, and the transceiver may be an input/output interface 2002. Further, the communication apparatus 200 shown in FIG. 20 may include a memory 2003.

An embodiment of this application further provides a computer-readable storage medium. All or some of the procedures in the foregoing method embodiments may be implemented by a computer program instructing related hardware. The program may be stored in the computer-readable storage medium. When the program is executed, the procedures of the foregoing method embodiments may be included. The computer-readable storage medium may be an internal storage unit of the terminal (including a data transmit end and/or a data receive end) in any one of the foregoing embodiments, for example, a hard disk drive or a memory of the terminal. Alternatively, the computer-readable storage medium may be an external storage device of the terminal, for example, a plug-in hard disk, a smart media card (smart media card, SMC), a secure digital (secure digital, SD) card, a flash card (flash card), or the like that is configured on the terminal. Further, the computer-readable storage medium may alternatively include both the internal storage unit of the terminal and the external storage device. The computer-readable storage medium is configured to store the computer program and other programs and data that are required by the terminal. The computer-readable storage medium may be further configured to temporarily store data that has been output or is to be output.

It should be noted that, in the specification, claims, and accompanying drawings of this application, the terms "first", "second", and the like are intended to distinguish between different objects but do not indicate a particular order. In addition, the terms "include" and "have" and any other variants thereof are intended to cover non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate the following three cases: Only A exists, only B exists, and both A and B exist, where A and B may be singular or plural. The character "/" generally indicates an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The foregoing descriptions of the implementations allow a person skilled in the art to clearly understand that, for the purpose of convenient and brief description, division into the functional modules is merely used as an example for description. During actual application, the foregoing functions may be allocated to different functional modules for implementation as required. In other words, an inner structure of the apparatus is divided into different functional modules to implement all or some of the functions described above.

In several embodiments provided in this application, it should be understood that the disclosed apparatus and method may be implemented in other manners. For example, the described apparatus embodiments are merely examples. For example, division into the modules or the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

Units described as separate components may or may not be physically separate, and components displayed as units may be one or more physical units, that is, may be located in one place, or may be distributed to a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, for example, a USB flash drive, a removable hard disk, a ROM, a RAM, a magnetic disk, or an optical disc.

What is claimed is:

1. A method, comprising:
obtaining, by a first communication apparatus, first configuration information, wherein the first configuration information instructs the first communication apparatus to perform carrier aggregation communication on at least two transmit carriers, the at least two transmit carriers comprise a first transmit carrier and a second transmit carrier, the first transmit carrier corresponds to a first communication standard, the second transmit carrier corresponds to a second communication standard that is different from the first communication standard;
obtaining, by the first communication apparatus, second configuration information, wherein the second configuration information comprises configuration information of at least one sounding reference signal (SRS) switching carrier group, each of the at least one SRS switching carrier group indicates a transmit carrier before SRS switching and a transmit carrier after SRS switching, and a communication standard of the transmit carrier before SRS switching is different from a communication standard of the transmit carrier after SRS switching; and
performing, by the first communication apparatus, carrier aggregation communication on the at least two transmit carriers based on the first configuration information.

2. The method according to claim 1, wherein:
the first configuration information comprises configuration information of at least two transmit standard carrier groups, wherein the configuration information of each of the at least two transmit standard carrier groups comprises:

identification information of a transmit standard carrier group that indicates a communication standard corresponding to the transmit standard carrier group; and
identification information of at least one transmit carrier in the transmit standard carrier group, and the identification information of the transmit standard carrier group; or
the first configuration information comprises:
identification information of the at least two transmit carriers; and
standard information of the at least two transmit carriers that indicates a communication standard of a transmit carrier corresponding to the identification information.

3. The method according to claim 1, wherein the method further comprises:
sending, by the first communication apparatus, capability information of the first communication apparatus, wherein the capability information of the first communication apparatus indicates one or more of the following capabilities: a communication standard supported by the first communication apparatus, that the first communication apparatus supports inter-radio access technology carrier aggregation (RAT CA), that the first communication apparatus supports sounding reference signal (SRS) switching in the inter-RAT CA, that the first communication apparatus supports joint uplink control information (UCI) feedback in the inter-RAT CA, or that the first communication apparatus supports symbol-level dynamic power sharing in the inter-RAT CA.

4. The method according to claim 1, wherein the method further comprises:
obtaining, by the first communication apparatus, first control information, wherein the first control information indicates transmit power control (TPC) commands of the at least two transmit carriers.

5. The method according to claim 1, wherein the method further comprises:
obtaining, by the first communication apparatus, second control information and third control information, wherein the second control information indicates a transmit power control (TPC) command of a transmit carrier corresponding to the first communication standard, and the third control information indicates a TPC command of a transmit carrier corresponding to the second communication standard.

6. The method according to claim 1, wherein the method further comprises:
obtaining, by the first communication apparatus, third configuration information, wherein the third configuration information indicates a first transmission control channel carrier and a second transmission control channel carrier, the first transmission control channel carrier corresponds to the first communication standard, and the second transmission control channel carrier corresponds to the second communication standard;
sending, by the first communication apparatus on the first transmission control channel carrier, transmission control information corresponding to the first communication standard; and
sending, by the first communication apparatus on the second transmission control channel carrier, transmission control information corresponding to the second communication standard.

7. The method according to claim 1, wherein the method further comprises:

determining, by the first communication apparatus, a third transmission control channel carrier, wherein the third transmission control channel carrier corresponds to the first communication standard or the second communication standard; and sending, by the first communication apparatus on the third transmission control channel carrier, transmission control information corresponding to the first communication standard and transmission control information corresponding to the second communication standard.

8. The method according to claim 1, wherein the method further comprises:

when a symbol of a channel corresponding to the first communication standard overlaps a symbol of a channel corresponding to the second communication standard, determining, by the first communication apparatus based on a transmit power of the symbol of the channel corresponding to the first communication standard, a transmit power of the symbol of the channel corresponding to the second communication standard.

9. A method, comprising:

sending, by a second communication apparatus, first configuration information, wherein the first configuration information instructs a first communication apparatus to perform carrier aggregation communication on at least two transmit carriers, the at least two transmit carriers comprise a first transmit carrier and a second transmit carrier, the first transmit carrier corresponds to a first communication standard, the second transmit carrier corresponds to a second communication standard that is different from the first communication standard;

sending, by the second communication apparatus, second configuration information, wherein the second configuration information comprises configuration information of at least one SRS switching carrier group, each of the at least one SRS switching carrier group indicates a transmit carrier before SRS switching and a transmit carrier after SRS switching, and a communication standard of the transmit carrier before SRS switching is different from a communication standard of the transmit carrier after SRS switching; and performing, by the second communication apparatus, carrier aggregation communication on the at least two transmit carriers based on the first configuration information.

10. The method according to claim 9, wherein:

the first configuration information comprises configuration information of at least two transmit standard carrier groups, wherein the configuration information of each of the at least two transmit standard carrier groups comprises:

identification information of the transmit standard carrier group that indicates a communication standard corresponding to the transmit standard carrier group; and identification information of at least one transmit carrier in the transmit standard carrier group; or the first configuration information comprises:

identification information of the at least two transmit carriers; and standard information of the at least two transmit carriers that indicates a communication standard of a transmit carrier corresponding to the identification information.

11. The method according to claim 9, wherein the method further comprises:

obtaining, by the second communication apparatus, capability information of the first communication apparatus, wherein the capability information of the first communication apparatus indicates one or more of the following capabilities: a communication standard supported by the first communication apparatus, that the first communication apparatus supports inter-radio access technology carrier aggregation (RAT CA), that the first communication apparatus supports sounding reference signal (SRS) switching in the inter-RAT CA, that the first communication apparatus supports joint uplink control information (UCI) feedback in the inter-RAT CA, or that the first communication apparatus supports symbol-level dynamic power sharing in the inter-RAT CA.

12. The method according to claim 9, wherein the method further comprises:

sending, by the second communication apparatus, first control information, wherein the first control information indicates transmit power control (TPC) commands of the at least two transmit carriers.

13. The method according to claim 9, wherein the method further comprises:

sending, by the second communication apparatus, second control information and third control information, wherein the second control information indicates a transmit power control (TPC) command of a transmit carrier corresponding to the first communication standard, and the third control information indicates a TPC command of a transmit carrier corresponding to the second communication standard.

14. The method according to claim 9, wherein the method further comprises:

sending, by the second communication apparatus, third configuration information, wherein the third configuration information indicates a first transmission control channel carrier and a second transmission control channel carrier, the first transmission control channel carrier corresponds to the first communication standard, and the second transmission control channel carrier corresponds to the second communication standard;

obtaining, by the second communication apparatus on the first transmission control channel carrier, transmission control information corresponding to the first communication standard; and obtaining, by the second communication apparatus on the second transmission control channel carrier, transmission control information corresponding to the second communication standard.

15. The method according to claim 9, wherein the method further comprises:

obtaining, by the second communication apparatus on a third transmission control channel carrier, transmission control information corresponding to the first communication standard and transmission control information corresponding to the second communication standard, wherein the third transmission control channel carrier corresponds to the first communication standard or the second communication standard.

16. An apparatus, comprising:

a transceiver configured to:

obtain first configuration information, wherein the first configuration information instructs the apparatus to perform carrier aggregation communication on at least two transmit carriers, the at least two transmit carriers comprise a first transmit carrier and a second transmit carrier, the first transmit carrier corresponds to a first communication standard, the second transmit carrier corresponds to a second communication standard that is different from the first communication standard; and obtain second configuration information, wherein the second configuration information comprises configuration information of at least one sounding reference signal (SRS) switching carrier group, each of the at least one SRS switching carrier group indicates a transmit carrier before SRS switching and a transmit carrier after SRS switching, and a communication standard of the transmit carrier before SRS switching is different from a communication standard of the transmit carrier after SRS switching; and a processor configured to perform carrier aggregation communication on the at least two transmit carriers based on the first configuration information.

17. The apparatus according to claim 16, wherein:

the first configuration information comprises configuration information of at least two transmit standard carrier groups, wherein the configuration information of each of the at least two transmit standard carrier groups comprises:

identification information of a transmit standard carrier group that indicates a communication standard corresponding to the transmit standard carrier group; and identification information of at least one transmit carrier in the transmit standard carrier group; or the first configuration information comprises:

identification information of the at least two transmit carriers; and standard information of the at least two transmit carriers that indicates a communication standard of a transmit carrier corresponding to the identification information.

18. The apparatus according to claim 16, wherein:

the transceiver is further configured to send capability information of the apparatus, wherein the capability information of the apparatus indicates one or more of the following capabilities: a communication standard supported by the apparatus, that the apparatus supports inter-radio access technology carrier aggregation (RAT CA), that the apparatus supports sounding reference signal (SRS) switching in the inter-RAT CA, that the apparatus supports joint uplink control information (UCI) feedback in the inter-RAT CA, or that the apparatus supports symbol-level dynamic power sharing in the inter-RAT CA.

* * * * *